(12) United States Patent
Kagami et al.

(10) Patent No.: US 9,443,651 B2
(45) Date of Patent: Sep. 13, 2016

(54) POWER SUPPLYING SYSTEM

(71) Applicant: Yazaki Corporation, Tokyo (JP)

(72) Inventors: Kazuyoshi Kagami, Yokosuka (JP); Satoru Horiuchi, Yokosuka (JP); Shingo Tanaka, Yokosuka (JP)

(73) Assignee: Yazaki Corporation, Tokyo (JP)

(*) Notice: Subject to any disclaimer, the term of this patent is extended or adjusted under 35 U.S.C. 154(b) by 409 days.

(21) Appl. No.: 14/027,703

(22) Filed: Sep. 16, 2013

(65) Prior Publication Data
US 2014/0015341 A1 Jan. 16, 2014

Related U.S. Application Data

(63) Continuation-in-part of application No. PCT/JP2012/056239, filed on Mar. 12, 2012.

(30) Foreign Application Priority Data

Mar. 18, 2011 (JP) .................................. 2011-060603
Mar. 18, 2011 (JP) .................................. 2011-060604

(51) Int. Cl.
*H01F 27/42* (2006.01)
*H01F 37/00* (2006.01)
(Continued)

(52) U.S. Cl.
CPC ............. *H01F 38/14* (2013.01); *B60L 11/182* (2013.01); *B60L 11/1831* (2013.01); *H02J 5/005* (2013.01);
(Continued)

(58) Field of Classification Search
CPC .. B60L 11/182; B60L 11/1831; H01F 38/14; H02J 5/005; Y02T 10/7005; Y02T 90/12; Y02T 90/121; Y02T 90/122; Y02T 90/125; Y02T 90/14

USPC .......................................................... 307/104
See application file for complete search history.

(56) References Cited

U.S. PATENT DOCUMENTS 5,431,264 A 7/1995 Tseng et al.
5,821,728 A 10/1998 Schwind
(Continued)

FOREIGN PATENT DOCUMENTS

JP 08-237890 A 9/1996
JP 2000-092752 A 3/2000
(Continued)

OTHER PUBLICATIONS

Supplementary European Search Report dated Aug. 25, 2014, issued for the corresponding European patent application No. 12761337.0.
(Continued)

*Primary Examiner* — Rexford Barnie
*Assistant Examiner* — Toan Vu
(74) *Attorney, Agent, or Firm* — Locke Lord LLP; James E. Armstrong, IV; Howard M. Gitten

(57) ABSTRACT

An object of the present invention is to provide a power supplying system able to supply electric power with high efficiency from a power supplying section to a power receiving section by suppressing a reduction of transmission efficiency caused by a gap between central axes of a power supplying coil and a power receiving coil. Two power supplying helical coils are provided. When a power receiving coil is arranged opposite to the power supplying helical coils with a gap in an axis direction thereof, electric power is transmitted from the power supplying helical coils by electromagnetic resonance. A CPU detects one closest to the power receiving coil of two power supplying helical coils as an adjacent coil, and controls on/off of the switches so as to supply the electric power to only the adjacent coil.

3 Claims, 18 Drawing Sheets

(51) Int. Cl.
  *H01F 38/00* (2006.01)
  *H01F 38/14* (2006.01)
  *H02J 5/00* (2016.01)
  *B60L 11/18* (2006.01)

(52) U.S. Cl.
  CPC ......... *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 8,178,995 B2 | 5/2012 | Amano et al. | |
| 2010/0052431 A1 | 3/2010 | Mita | |
| 2010/0213770 A1 | 8/2010 | Kikuchi | |
| 2011/0140653 A1* | 6/2011 | Jung | H02J 7/025 320/108 |
| 2012/0049642 A1* | 3/2012 | Kim | H02J 5/005 307/104 |
| 2012/0161530 A1* | 6/2012 | Urano | H02J 7/025 307/104 |

FOREIGN PATENT DOCUMENTS

| | | |
|---|---|---|
| JP | 2009-071909 A | 4/2009 |
| JP | 2010-068657 A | 3/2010 |
| JP | 2010-124522 A | 6/2010 |
| JP | 2010-141966 A | 6/2010 |
| JP | 2010-183812 A | 8/2010 |
| JP | 2010-220284 A | 9/2010 |
| JP | 2010-226889 A | 10/2010 |
| JP | 2010-246348 A | 10/2010 |
| JP | 2011-229360 A | 11/2011 |
| JP | 2012-196070 A | 10/2012 |
| WO | WO-2010/006078 A1 | 1/2010 |

OTHER PUBLICATIONS

International Search Report dated May 29, 2012, issued for PCT/JP2012/056239.

Written Opinion dated May 29, 2012, issued for PCT/JP2012/056239.

Office Action mailed Jun. 23, 2015, issued for the Japanese patent application No. 2011-060603 and English translation thereof.

Office Action dated Mar. 9, 2016, issued for the European patent application No. 12 761 337.0.

* cited by examiner

THE PRESENT INVENTION PRODUCT A

THE PRESENT INVENTION PRODUCT B

THE PRESENT INVENTION PRODUCT C

THE PRESENT INVENTION PRODUCT D

CONVENTIONAL PRODUCT A

GAP d BETWEEN THE CENTRAL AXES [mm]

CONVENTIONAL PRODUCT B

POWER SUPPLYING SYSTEM

TECHNICAL FIELD

The present invention relates to a power supplying system, in particular, a power supplying system for supplying electric power from a power supplying coil to a power receiving coil in a noncontact manner.

BACKGROUND ART

As the above power supplying system, for example, the systems shown in FIGS. 21 and 22 are known (PTL1, PTL2). As shown in FIGS. 21 and 22, a power supplying system 1 includes: a power supplying section 3; and a power receiving section 5. The power supplying section 3 is provided with a power supplying loop antenna 6 to which the electric power is supplied, and a power supplying helical coil 7 (power supplying coil) arranged opposite to the power supplying loop antenna 6 with a gap in an axial direction of the power supplying loop antenna 6 and electromagnetically bonded to the power supplying loop antenna 6. When the electric power is supplied to the power supplying loop antenna 6, the electric power is transmitted to the power supplying helical coil 7 by electromagnetic induction.

The power receiving section 5 is provided with a power receiving helical coil 8 (power receiving coil) arranged opposite to the power supplying helical coil 7 with a gap in an axial direction of the power supplying helical coil 7 and electromagnetically resonating with the power supplying helical coil 7, and a power receiving loop antenna 9 arranged opposite to the power receiving helical coil 8 with a gap in an axial direction of the power receiving helical coil 8 and electromagnetically coupled to the power receiving helical coil 8. When the electric power is transmitted to the power supplying helical coil 7, the electric power is transmitted to the power receiving helical coil 8 wirelessly by electromagnetic resonance.

Further, when the electric power is transmitted to the power receiving helical coil 8, the electric power is transmitted to the power receiving loop antenna 9 by electromagnetic resonance, and supplied to a load connected to the power receiving loop antenna 9. According to the above power supplying system 1, the electric power can be transmitted from the supplying side to the receiving side wirelessly by the electromagnetic resonance between the power supplying helical coil 7 and the power receiving helical coil 8.

Further, when the power receiving section 5 is provided on a vehicle 4, and the power supplying section 3 is provided on a road 2 or the like, it is considered that the electric power is supplied to the load mounted on the vehicle 4 wirelessly using the power supplying system 1. Incidentally, in the power supplying system 1, it is difficult to stop the vehicle in a manner that a central axis $C_1$ of the power supplying helical coil 7 and a central axis $C_2$ of the power receiving helical coil 8 are coaxial, and as shown in FIG. 23, a gap d may be generated between the central axes $C_1$ and $C_2$.

The present inventors simulated the transmission efficiency of the power receiving loop antenna 9 of a conventional product A as the power supplying system 1 shown in FIG. 22 when the gap d between the central axes $C_1$ and $C_2$ is varied within a range from 0 mm to D mm. The result is shown by solid line in FIG. 24.

Incidentally, in this case, the power supplying loop antenna 6 and the power receiving loop antenna 9 are the same, and a diameter $R_{11}=R_{12}=0.6D$ mm. The power supplying helical coil 7 and the power receiving helical coil 8 are the same, and a diameter $R_{21}=R_{22}=D$ mm. Further, a distance L1 between the power supplying helical coil 7 and the power receiving helical coil 8 is fixed to 0.68D mm. Further, the characteristic impedances of both power supplying loop antenna 6 and the power receiving loop antenna 9 are 50Ω.

As shown by solid line in FIG. 24, when the gap d between the central axes $C_1$, $C_2$ is 0 mm to 0.33D mm, the transmission efficiency is almost 100%. When the gap d between the central axes $C_1$, $C_2$ is more than 0.33D mm, the transmission efficiency starts to reduce. As the gap d becomes larger, the reduction of the transmission efficiency becomes larger.

Therefore, for solving this problem, as shown in FIG. 25, it is considered that the diameter $R_{21}$ of the power supplying helical coil 7 is larger than the diameter $R_{22}$ of the power receiving helical coil 8 to suppress the reduction of the transmission efficiency.

In a conventional product B as the power supplying system 1 shown in FIG. 25, a measurement result of the transmission efficiency of the power receiving loop antenna 9 when the gap d between the central axes $C_1$, $C_2$ is varied in a range from 0 mm to D mm is shown by dotted line in FIG. 24.

Incidentally, in this case, the power receiving loop antenna 9 is the same as the conventional product A, and the diameter $R_{12}=0.6D$ mm. The power receiving helical coil 8 is the same as the conventional product A, and the diameter $R_{22}=D$ mm. Further, the diameter $R_{11}$ of the power supplying loop antenna 6=1.7D mm, and the diameter $R_{21}$ of the power supplying helical coil 7=2D mm. Further, the distance $L_1$ is fixed to 0.68D mm similar to the conventional product A.

As shown by dotted line in FIG. 24, when the diameter $R_{21}$ of the power supplying helical coil 7 is larger than the diameter $R_{22}$ of the power receiving helical coil 8, the reduction of the transmission efficiency is suppressed. In addition, when the diameter $R_{21}$ of the power supplying helical coil 7 is larger from 2D mm to 4D mm, it was checked that the reduction of the transmission efficiency is further suppressed.

However, there is a problem that even when the diameter $R_{21}$ of the power supplying helical coil 7 is larger than the diameter $R_{22}$ of the power receiving helical coil 8, the reduction of the transmission efficiency is not fully suppressed.

Further, the present inventors simulated the transmission efficiency of the power receiving loop antenna 9 of the power supplying system 1 shown in FIG. 25, when the gaps (dx, dy) of the central axes $C_1$, $C_2$ of the power receiving helical coil 8 on an X-Y plane in FIG. 25 are varied in a range 0 mm≤dx≤1.5$d_1$ mm, 0 mm≤dy≤1.5$d_1$ mm. The result is shown in FIG. 26.

Incidentally, in this case, the diameter $R_{12}$ of the power receiving loop antenna 9 is 0.5$d_1$ mm, and the diameter $R_{22}$ of the power receiving helical coil 8 is $d_1$ mm. Further, the diameter $R_{11}$ of the power supplying loop antenna 6 is 2.67$d_1$ mm, and the diameter $R_{21}$ of the power supplying helical coil 7 is 3$d_1$ mm. Namely, the diameter $R_{21}$ of the power supplying helical coil 7 is about three times the diameter $R_{22}$ of the power receiving helical coil 8. Further, the distance $L_1$ between the power supplying helical coil 7 and the power receiving helical coil 8 is fixed to 0.67$d_1$ mm. The characteristic impedances of both power supplying loop antenna 6 and the power receiving loop antenna 9 are 50Ω.

As shown in FIG. 26, when the gaps dx, dy of the central axes C1, C2 are 0 mm to $d_1$ mm, the transmission efficiency is nearly 100%. However, there is a problem that when the gaps dx, dy of the central axes $C_1$, $C_2$ becomes more than $d_1$ mm, the transmission efficiency becomes reduced, and as the gaps dx, dy are larger, the transmission efficiency are further reduced.

Further, in PTL 3, a power supplying system in which a plurality of power supplying coils is arranged in a travel direction of a vehicle is proposed. In this power supplying system, the vehicle is moved in the travel direction by supplying the electric power to the vehicle sequentially with from a rear side coil to a front side coil. The electric power cannot be supplied while the vehicle is stopped.

CITATION LIST

Patent Literature

[PTL 1]
JP, A, 2010-124522
[PTL 2]
JP, A, 2010-68657
[PTL 3]
JP, A, 2009-71909

SUMMARY OF INVENTION

Technical Problem

Accordingly, an object of the present invention is to provide a power supplying system able to supply electric power with high efficiency from a power supplying section to a power receiving section by suppressing a reduction of transmission efficiency caused by a gap between central axes of a power supplying coil and a power receiving coil.

Solution to Problem

For solving the above problems, according to a first aspect of the present invention, there is provided a power supplying system including:
a plurality of power supplying coils to which electric power is supplied;
a power receiving coil to which electric power from the power supplying coils is transmitted by electromagnetic resonance with the power supplying coils when the power receiving coil is arranged opposite to and separated from the power supplying coils in a central axis direction thereof;
a position detecting device configured to detect one power supplying coil closest to the power receiving coil among the plurality of power supplying coils as an adjacent coil; and
a first power supplying device configured to supply the electric power to only the adjacent coil detected by the position detecting device among the plurality of power supplying coils.

According to a second aspect of the present invention, there is provided the power supplying system 1 as described in the first aspect further including:
a transmitter arranged close to the power receiving coil and configured to output a light signal or a wireless signal; and
a plurality of receivers respectively arranged close to each of the plurality of power supplying coils and configured to receive the light signal or the wireless signal from the transmitter,
wherein the position detecting device detects the adjacent coil based on signals received by the plurality of receivers.

According to a third aspect of the present invention, there is provided the power supplying system as described in the first aspect further including:
a transmitting device configured to make the receiving coil transmit a wireless signal periodically; and
a receiving device configured to detect wireless signals received by the plurality of power supplying coils from the power receiving coil, wherein the position detecting device detects the power supplying coil having the highest signal level of the wireless signal received from the power receiving coil as the adjacent coil among the plurality of power supplying coils.

According to a fourth aspect of the present invention, there is provided the power supplying system as described in the first aspect further including:
a second power supplying device configured to supply the electric power sequentially to the plurality of power supplying coils; and a reflective wave detecting device configured to detect reflective waves of the electric power reflected by each of the power supplying coils,
wherein the position detecting device detects the power supplying coil having the smallest reflective wave detected by the reflective wave detecting device as the adjacent coil among the plurality of power supplying coils while the second power supplying device supplies the electric power.

According to a fifth aspect of the present invention, there is provided the power supplying system as described in any one of the first to fourth aspects,
wherein the power supplying coils and the power receiving coil are formed in a circular helical shape, and
wherein the plurality of power supplying coils are partially overlapped with each other.

According to a sixth aspect of the present invention, there is provided the power supplying system as described in any one of the first to fourth aspects,
wherein the power supplying coils and the power receiving coil are formed in a rectangular spiral shape, and
wherein the plurality of power supplying coils are separated from each other in the same plane.

According to a seventh aspect of the present invention, there is provided a power supplying system including:
a power supplying coil to which electric power is supplied; and
a plurality of power receiving coils to which electric power from the power supplying coil is transmitted by electromagnetic resonance with the power supplying coil when the power receiving coils are arranged opposite to and separated from the power supplying coil in a central axis direction thereof;
wherein the plurality of power receiving coils are arranged separated from each other in the same plane.

According to a eighth aspect of the present invention, there is provided the power supplying system as described in the seventh aspect,
wherein a diameter of the power supplying coil is provided larger than a diameter of the power receiving coil.

Advantageous Effects of Invention

As explained above, according to the invention described in the first aspect, by providing a plurality of power supplying coils, the reduction of transmission efficiency caused by a gap between center axes of the power supplying coil and the power receiving coil can be suppressed. Further, when the first power supplying device supplies the electric power to only the adjacent coil detected by the position detecting device among the plurality of power supplying coils, an interference caused by supplying simultaneously the electric power to the plurality of power supplying coils is eliminated. Therefore, the reduction of transmission efficiency caused by a gap between center axes of the power supplying coil and the power receiving coil can be further suppressed. Therefore, the electric power can be supplied from the power supplying section to the power receiving section with high efficiency.

According to the invention described in the second aspect, because the position detecting device detects the adjacent coil based on signals received by the plurality of receivers, the adjacent coil can be correctly detected.

According to the invention described in the third aspect, the position detecting device detects the power supplying coil having the highest signal level of the wireless signal received from the power receiving coil as the adjacent coil among the plurality of power supplying coils. Therefore, there is no need to provide a transmitter and a receiver for transmitting and receiving the light signal or the wireless signal other than the power supplying coil and the power receiving coil. Therefore, the number of components can be reduced.

According to the invention described in the fourth aspect, the position detecting device detects the power supplying coil having the smallest reflective wave detected by the reflective wave detecting device as the adjacent coil among the plurality of power supplying coil. Therefore, the adjacent coil can be detected without transmitting the signal to the power receiving coil periodically. Therefore, the electric power can be supplied from the power supplying section to the power receiving section with higher efficiency.

According to the invention described in the fifth aspect, the reduction of transmission efficiency can be suppressed at a point where the supply of the AC power is switched from one to the other adjacent to each other.

According to the invention described in the sixth aspect, in a plane perpendicular to the axes of the plurality of power supplying coils, the reduction of transmission efficiency caused by a gap between the central axes of the power supplying coil and the power receiving coil in both an arranging direction of the power supplying coils and a direction perpendicular to the arranging direction can be suppressed.

According to the invention described in the seventh aspect, a plurality of power receiving coils is provided, and the plurality of power receiving coils are separated from each other in the same plane. Therefore, even when the electric power transmitted to some of the plurality of power receiving coils is reduced due to a gap between the central axes of the power supplying coil and the power receiving coils, the electric power transmitted to the rest of the plurality of power receiving coils is increased. Therefore, the reduction of transmission efficiency caused by a gap between the central axes can be suppressed, and the electric power can be supplied from the power supplying section to the power receiving section with high efficiency.

According to the invention described in the eighth aspect, because a diameter of the power supplying coil is provided larger than a diameter of the power receiving coil, the reduction of transmission efficiency caused by a gap between the central axes of the power supplying coil and the power receiving coil can be further suppressed, and the electric power can be supplied from the power supplying section to the power receiving section with high efficiency.

DESCRIPTION OF EMBODIMENTS

First Embodiment

Figure 1:
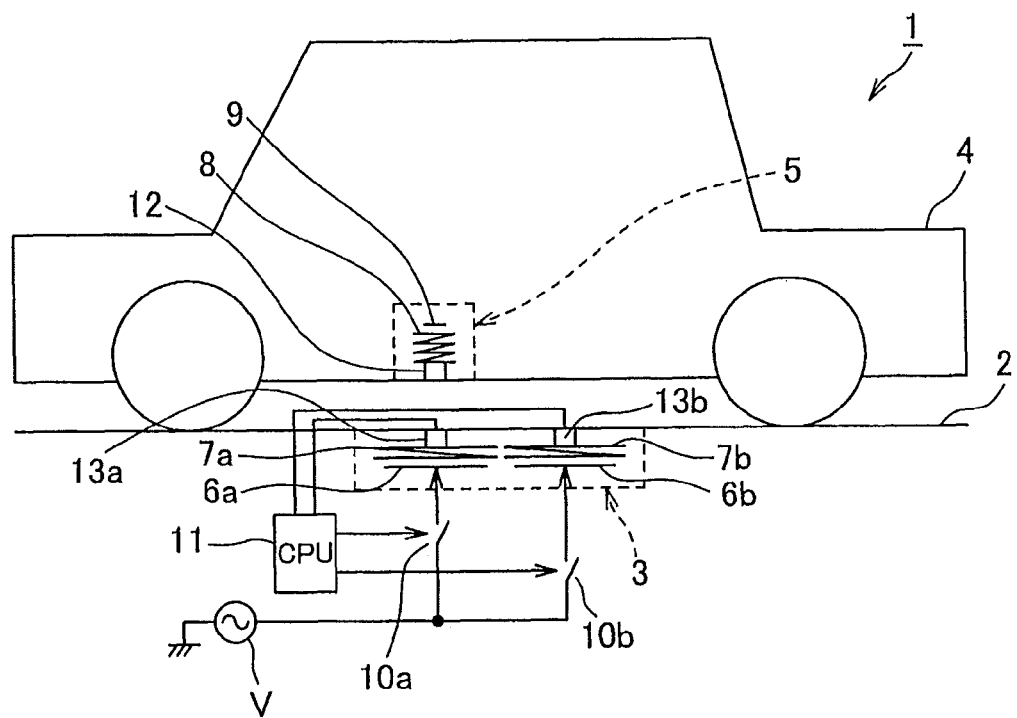
FIG. 1 is a schematic view showing a power supplying system according to a first embodiment of the present invention.
Figure 2A:
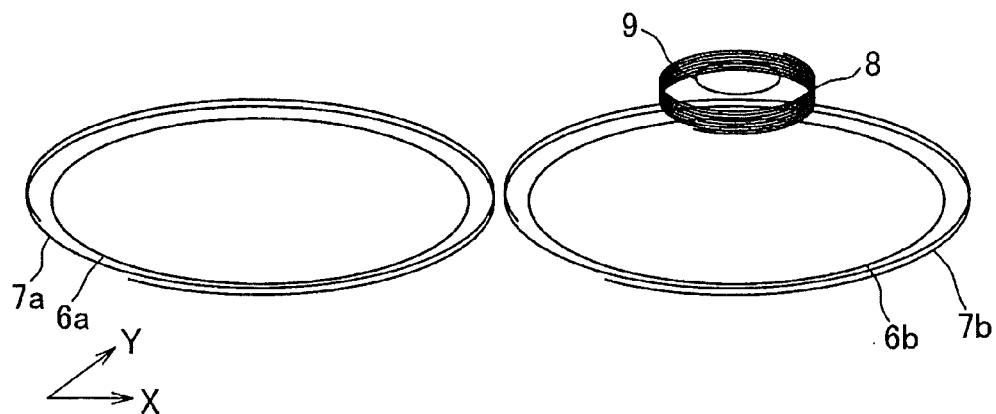
FIG. 2A is a perspective view showing a power supplying section and a power receiving section defining the power supplying system shown in FIG. 1.
Figure 2B:
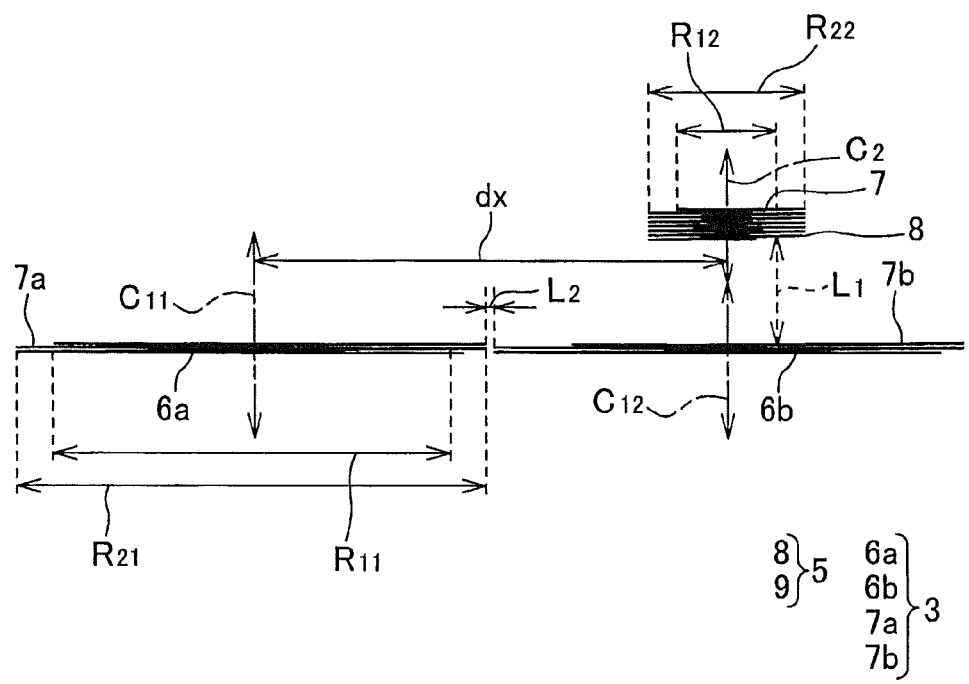
FIG. 2B is a side view showing the power supplying section and the power receiving section defining the power supplying system shown in FIG. 1.

Hereinafter, a power supplying system of the present invention will be explained with reference to FIGS. 1 and 2. FIG. 1 is a schematic view showing a power supplying system according to a first embodiment of the present invention. FIGS. 2A and 2B are a perspective view and a side view showing a power supplying section and a power receiving section defining the power supplying system shown in FIG. 1. As shown in FIG. 1, a power supplying system 1 includes: a power supplying section 3 provided on a road 2 or the like; and a power receiving section 5 provided on a belly portion or the like of a vehicle 4.

As shown in FIGS. 1 and 2, the power supplying section 3 is provided with two power supplying loop antennas 6a, 6b, and power supplying helical coils 7a, 7b arranged opposite to the central axes of the power supplying loop antennas 6a, 6b with a gap and electromagnetically coupled to the power supplying loop antennas 6a, 6b.

These power supplying loop antennas 6a, 6b are respectively formed in a circular loop shape, and the central axes $C_{11}$ and $C_{12}$ (FIG. 2B) thereof are arranged in a direction from the road 2 toward the belly portion of the vehicle 4, namely, a vertical direction. AC power from an AC power source V (FIG. 1) is supplied to the power supplying loop antennas 6a, 6b. These power supplying loop antennas 6a, 6b are provided equal to each other.

The power supplying helical coils 7a, 7b are made by, for example, winding a wire in a circular helical shape. The diameters of the power supplying helical coils 7a, 7b are respectively formed larger than the diameters of the power supplying loop antennas 6a, 6b. Further, the power supplying helical coils 7a, 7b are equal to each other, and arranged coaxially with the power supplying loop antennas 6a, 6b at the vehicle 4 side of the power supplying loop antennas 6a, 6b. In this embodiment, the power supplying loop antennas 6a, 6b are arranged in the same plane as the wound wires furthest away from the vehicle 4 of the power supplying helical coils 7a, 7b.

Thereby, the power supplying loop antenna 6a and power supplying helical coil 7a are provided separated from each other, and the power supplying loop antenna 6b and power supplying helical coil 7b are provided separating from each other, within a range that they can be electromagnetically coupled together, namely, within a range that when the AC power is supplied to the power supplying loop antennas 6a, 6b, electromagnetic induction is generated in the power supplying helical coils 7a, 7b. Further, the power supplying helical coils 7a, 7b are provided in the same plane and separated from each other by a distance L2 (FIG. 2) in an arranging direction X.

The power receiving section 5 is provided with a power receiving helical coil 8 arranged opposite to the power supplying helical coils 7a, 7b with a gap in their central axes direction to electromagnetically resonate, and a power receiving loop antenna 9 arranged opposite to the power receiving helical coil 8 in the central axis direction thereof to be electromagnetically coupled to the power receiving helical coil 8.

A not-shown load such as on-vehicle battery is connected to the power receiving loop antenna 9. Further, the power receiving loop antenna 9 is formed in a circular loop shape, and its central axis $C_2$ (FIG. 2) is arranged in a direction from the belly portion of the vehicle 4 toward the road 2, namely, a vertical direction. Further, a diameter of the power receiving loop antenna 9 is smaller than the diameters of the power supplying loop antennas 6a, 6b.

The power receiving helical coil 8 is formed by, for example, winding a wire in a circular helical shape. A diameter of the power receiving helical coil 8 is formed smaller than the diameters of the power supplying helical coils 7a, 7b, and larger than the diameter of the power receiving loop antenna 9. Namely, the diameters of the power supplying helical coils 7a, 7b are formed larger than the diameter of the power receiving helical coil 8. Further, the power receiving helical coil 8 is arranged at the road 2 side of the power receiving loop antenna 9 and coaxially with the power receiving loop antenna 9. In this embodiment, the power receiving loop antenna 9 is arranged in the same plane as the wound wire furthest away from the road 2 of the power receiving helical coil 8.

Thereby, the power receiving loop antenna 9 and the power receiving helical coil 8 are provided separated from each other within a range that they can be electromagnetically coupled together, namely, within a range that when the AC power is supplied to the power receiving helical coil 8, electromagnetic induction is generated in the power receiving loop antenna 9.

According to the above power supplying system 1, when the power receiving section 5 of the vehicle 4 is moved close to the power supplying section 3 provided on the road 2, and the power supplying helical coils 7a, 7b become opposite to the power receiving helical coil 8 in the central axes direction with a gap, the power supplying helical coils 7a, 7b and the power receiving helical coil 8 electromagnetically resonate so that the electric power is supplied from the power supplying section 3 to the power receiving section 5 in a contactless manner.

To explain specifically, when the AC current is supplied to the power supplying loop antennas 6a, 6b, this electric power is transmitted to the power supplying helical coils 7a, 7b by electromagnetic induction. Namely, the electric power is supplied to the power supplying helical coils 7a, 7b via the power supplying loop antennas 6a, 6b. When the electric power is transmitted to the power supplying helical coils 7a, 7b, the electric power is transmitted to the power receiving helical coil 8 wirelessly by resonance of magnetic field. Further, when the electric power is transmitted to the power receiving helical coil 8, the electric power is transmitted to the power receiving loop antenna 9 by electromagnetic induction, and supplied to the load connected to the power receiving loop antenna 9.

As shown in FIG. 1, the above power supplying system 1 further includes: a switch 10a provided between the power supplying loop antenna 6a and the AC source V; a switch 10b provided between the power supplying loop antenna 6b and the AC source V; a CPU 11 for controlling on/off of these switches 10a, 10b; a transmitter 12 arranged in the vicinity of the power receiving helical coil 8; and two receivers 13a, 13b respectively arranged in the vicinity of the two power supplying helical coils 7a, 7b.

The switches 10a, 10b are connected in parallel to each other. Thereby, when the switch 10a is turned on, and the switch 10b is turned off, the AC power from the AC source V is only supplied to the power supplying loop antenna 6a, and not supplied to the power supplying loop antenna 6b. In contrast, when the switch 10a is turned off, and the switch 10b is turned on, the AC power from the AC source V is only supplied to the power supplying loop antenna 6b, and not supplied to the power supplying loop antenna 6a.

The CPU 11 is connected to these switches 10a, 10b, and the later-described receivers 13a, 13b, and controls the whole power supplying section 3. The transmitter 12 is mounted on the belly portion of the vehicle 4 so as to be arranged in the vicinity of the power receiving helical coil 8. The transmitter 12 is defined by a lighting element for transmitting light signal, a transmitting antenna for transmitting wireless signal, a transmitting circuit for controlling the lighting element and the transmitting antenna, and the like. The transmitter 12 periodically transmits the light signal or the wireless signal downward in a vertical direction.

The receiver 13a is installed on the road 2 so as to be arranged in the vicinity of the power supplying helical coil 7a. The receiver 13b is installed on the road 2 so as to be arranged in the vicinity of the power supplying helical coil 7b. The receivers 13a, 13b are respectively defined by a light receiving element for receiving light signal, a receiving antenna for receiving wireless signal, a receiving circuit for detecting the signal received by the light receiving element or the receiving antenna, and the like. The receivers 13a, 13b receive the light signal or the wireless signal transmitted from the transmitter 12 and output its result to the CPU 11.

The CPU 11 works as a position detecting device, and detects one closest to the power receiving helical coil 8 among two power supplying helical coils 7a, 7b as an adjacent coil based on the receiving result from the receivers 13a, 13b. Specifically, when the signal level received by the receiver 13a is higher than the signal level received by the receiver 13b, the CPU 11 detects the power supplying helical coil 7a as the adjacent coil. When the signal level received by the receiver 13b is higher than the signal level received by the receiver 13a, the CPU 11 detects the power supplying helical coil 7b as the adjacent coil.

Then, the CPU 11 works as a first power supplying device. The CPU 11 controls on/off of the switches 10a, 10b so as to supply the electric power to only the adjacent coil among the power supplying helical coils 7a, 7b. Specifically, when the power supplying helical coil 7a is detected as the adjacent coil, the CPU 11 turns on the switch 10a, and turns off the switch 10b so that the electric power from the AC source V is only supplied to the power supplying helical coil 7a. In contrast, when the power supplying helical coil 7b is detected as the adjacent coil, the CPU 11 turns off the switch 10a, and turns on the switch 10b so that the electric power from the AC source V is only supplied to the power supplying helical coil 7b.

According to the power supplying system 1 of the first embodiment described above, by providing a plurality of power supplying helical coils 7a, 7b, the reduction of transmission efficiency caused by the gap between the central axes $C_{11}$, $C_{12}$ and $C_2$ of the power supplying helical coils 7a, 7b and the power receiving helical coil 8 can be suppressed. Further, when the CPU 11 supplies the electric power to only the adjacent coil among the two power supplying helical coils 7a, 7b, an interference caused by supplying simultaneously the electric power to the plurality of power supplying helical coils 7a, 7b is eliminated. Therefore, the reduction of transmission efficiency caused by the gap between the central axes $C_{11}$, $C_{12}$ and $C_2$ of the power supplying helical coils 7a, 7b and the power receiving helical coil 8 can be further suppressed. Therefore, the electric power can be supplied from the power supplying section 3 to the power receiving section 5 with high efficiency.

Further, according to the power supplying system 1 of the first embodiment described above, because the CPU 11 detects the adjacent coil based on signals received by the two receivers 13a, 13b, the adjacent coil can be correctly detected.

Next, the present inventors simulated the transmission efficiency from the power supplying helical coil 7 to the power receiving helical coil 8 of a conventional product B as the power supplying system 1 shown in FIG. 16 when the gap dx between the central axes $C_1$ and $C_2$ is varied within a range from 0 mm to $2.3d_1$ mm. Further, the present inventors simulated the transmission efficiency from the power supplying helical coils 7a, 7b to the power receiving helical coil 8 of a present invention product A as the power supplying system 1 shown in FIG. 2 when the gap dx in an arranging direction X between the central axes $C_{11}$ and $C_2$ is varied within a range from 0 mm to $3d_1$ mm to confirm an effect of the present invention. The result is shown in FIG. 3.

Incidentally, the power supplying helical coils 7, 7a, 7b are equal to each other, and the diameter $R_{21}=3d1$ mm. The power supplying loop antennas 6, 6a, 6b are also equal to each other. The power receiving helical coil 8 of the conventional product B is the same as the power receiving helical coil 8 of the present invention product. The power receiving loop antenna 9 of the conventional product B is the same as the power receiving loop antenna 9 of the present invention product. Further, the distance $L_1$ of the conventional product is the same as the present invention product, and is fixed to $0.67d_1$ mm. The distance $L_2$ is fixed to 0.05d1 mm.

Further, in the present invention product A, when the gap dx is from 0 mm to $1.5d_1$ mm, the AC source V is only supplied to the power supplying loop antenna 6a and the power supplying helical coil 7a. When the gap dx is from $1.5d_1$ mm to $3d_1$ mm, the AC source V is only supplied to the power supplying loop antenna 6b and the power supplying helical coil 7b. Further, in this simulation, the characteristic impedance of the power receiving loop antenna 9 is fixed to 50Ω, the characteristic impedance of the one to which the AC source V is supplied among the power supplying loop antennas 6a, 6b is 50Ω, and the characteristic impedance of the other one to which the AC source V is not supplied among the power supplying loop antennas 6a, 6b is 1000Ω to be pseudo open.

Figure 3:
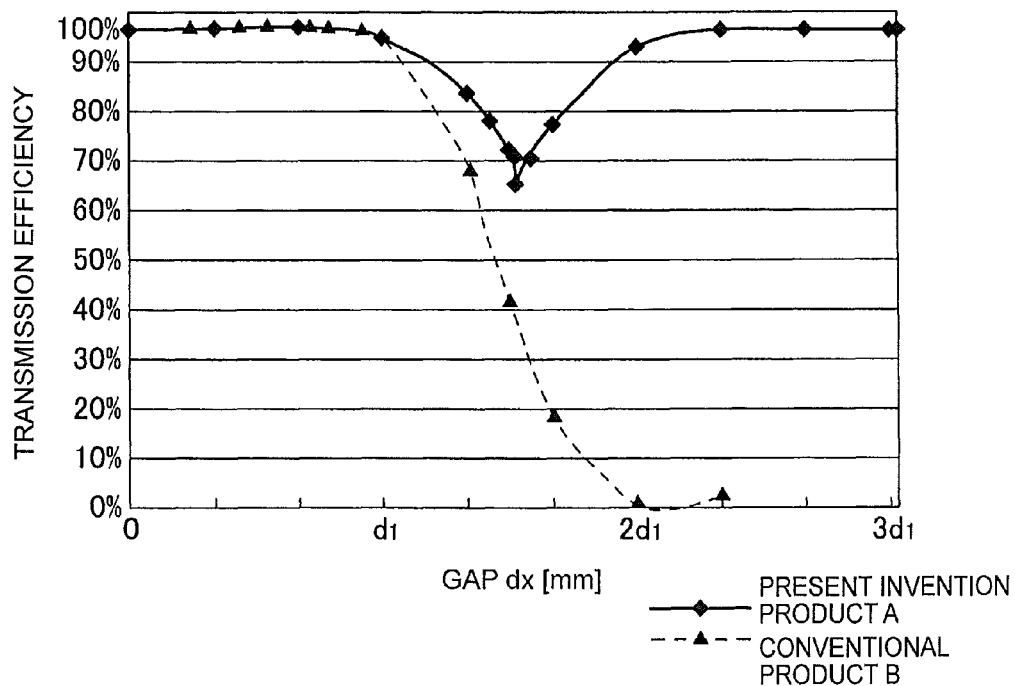
FIG. 3 is a graph showing simulation results of transmission efficiency of a conventional product B shown in FIG. 25 when a gap d between central axes $C_1$, $C_2$ is varied in a range from 0 mm to $2.3d_1$ mm, and of transmission efficiency of a present invention product A when a clap dx between the central axes $C_{11}$, $C_2$ is varied in a range from 0 to $3d_1$ mm.

As shown in FIG. 3, in the conventional product B, as the gap dx becomes larger, the transmission efficiency is gradually reduced. In the present invention product A, though the transmission efficiency is slightly reduced around the switching point of power supply, there is a high efficiency area again over this point, and the high efficiency transmission area is generated continuously.

Second Embodiment

Next, a second embodiment will be explained. In the first embodiment described above, the transmitter 12 is arranged in the vicinity of the power receiving helical coil 8, the receivers 13a, 13b are respectively arranged in the vicinity of the power supplying helical coils 7a, 7b, and the CPU 11 detects the adjacent coil based on the light signal or the wireless signal from the transmitter 12 received by the receivers 13a, 13b. In the second embodiment, these transmitter 12, and receivers 13a, 13b are eliminated.

Figure 4:
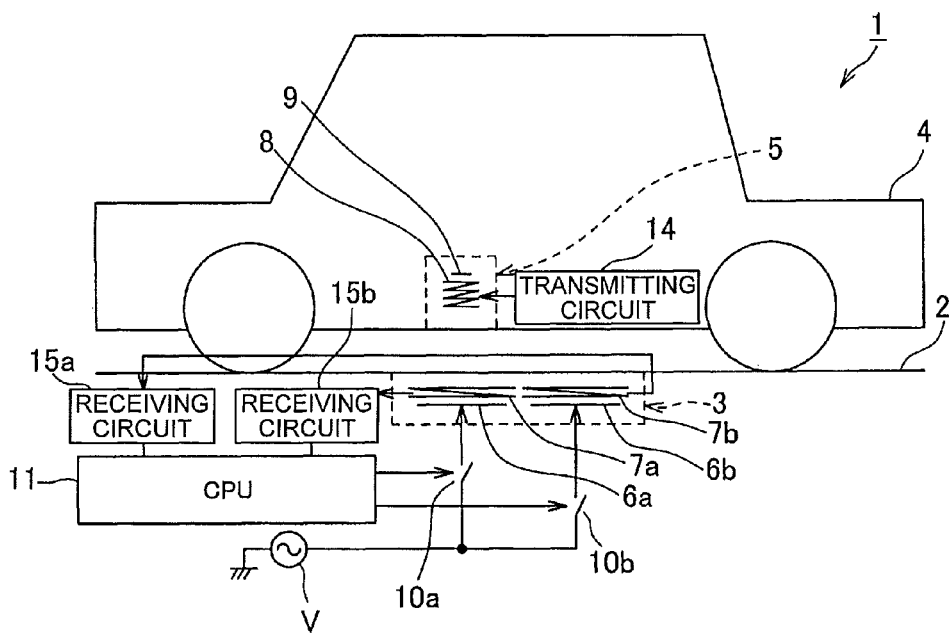
FIG. 4 is a schematic view showing a power supplying system according to a second embodiment of the present invention.
Figure 5:
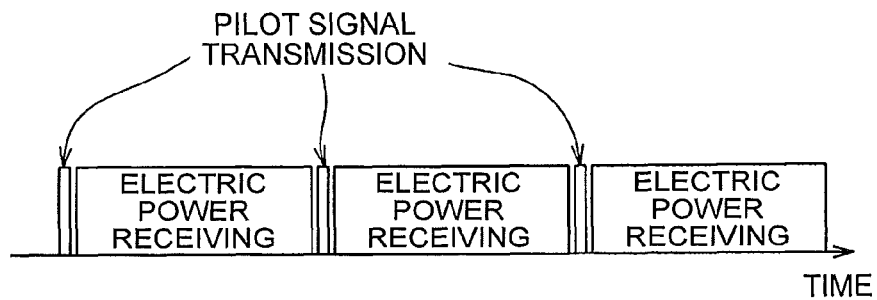
FIG. 5 is a time chart showing an operation of a power receiving helical coil shown in FIG. 4.

Namely, in the second embodiment, as shown in FIG. 4, the power supplying system 1 further includes: a transmitting circuit 14 as a transmitting device connected to both ends of the power receiving helical coil 8 and supplying electric power to the power receiving helical coil 8 to make the power receiving helical coil 8 transmit a pilot signal (see FIG. 5) as a wireless signal periodically; and receiving circuits 15a, 15b respectively connected to both ends of the two power supplying helical coils 7a, 7b to detect the pilot signal received by the two power supplying helical coils 7a, 7b. The receiving circuits 15a, 15b supply the detected pilot signal to the CPU 11.

The CPU 11 detects the one coil of the power supplying helical coils 7a, 7b corresponding to the one circuit receiving the pilot signal of the highest signal level among the receiving circuits 15a, 15b as the adjacent coil. Namely, when the signal level of the pilot signal received by the receiving circuit 15a is higher than the signal level of the pilot signal received by the receiving circuit 15b, the CPU 11 detects the power supplying helical coil 7a as the adjacent coil. In contrast, when the signal level of the pilot signal received by the receiving circuit 15b is higher than the signal level of the pilot signal received by the receiving circuit 15a, the CPU 11 detects the power supplying helical coil 7b as the adjacent coil.

According to the second embodiment described above, the CPU 11 detects the one coil having the highest signal level of the pilot signal from the power receiving helical coil 8 as the adjacent coil among the two power supplying helical coils 7a, 7b. Therefore, there is no need to provide the transmitter 12 and the receivers 13a, 13b for transmitting and receiving the light signal or the wireless signal other than the power supplying helical coils 7a, 7b and the power receiving helical coil 8. Therefore, the number of components can be reduced.

Third Embodiment

Figure 6:
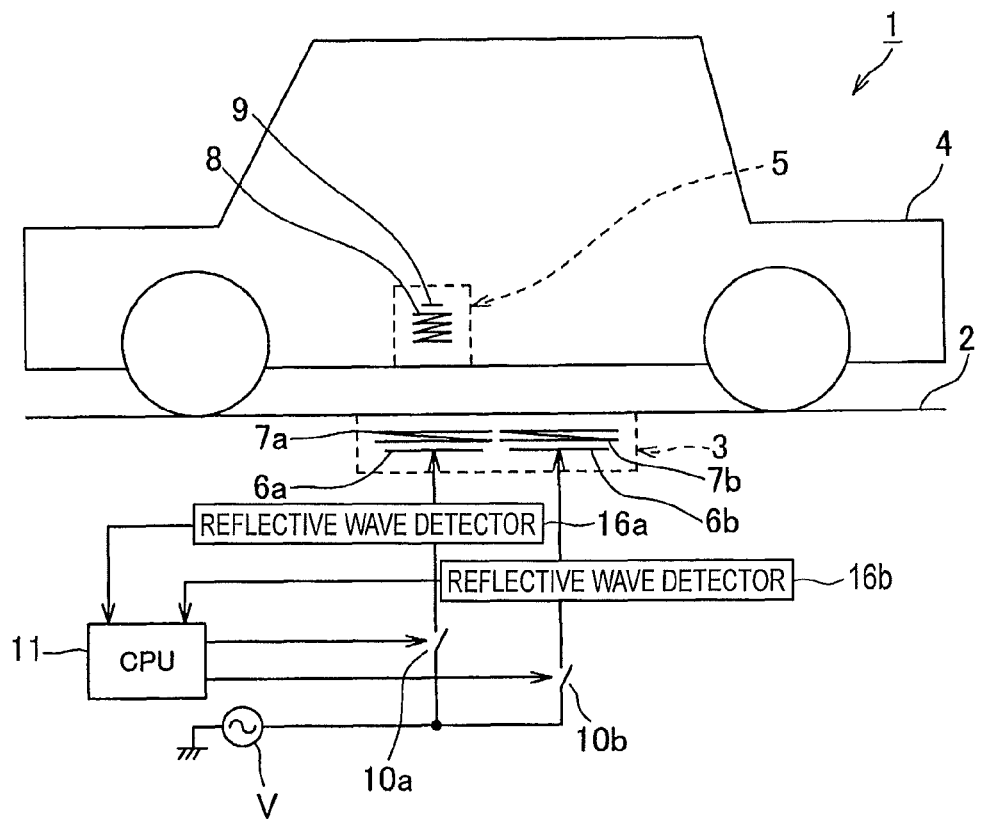
FIG. 6 is a schematic view showing a power supplying system according to a third embodiment of the present invention.

Next, a third embodiment will be explained. In the third embodiment also, the transmitter 12, and the receivers 13a, 13b are eliminated. Namely, in the third embodiment, as shown in FIG. 6, the power supplying system 1 further includes: reflective wave detectors 16a, 16b as the reflective wave detecting devices respectively provided between the two power supplying loop antennas 6a, 6b and the AC source V for detecting the reflective wave from the two power supplying helical coils 7a, 7b via the power supplying loop antennas 6a, 6b to the AC source V. A directional detector, a circulator, or the like can be used as the reflective wave detectors 16a, 16b. The reflective wave detectors 16a, 16b outputs the detected reflective wave to the CPU 11.

Reflective characteristic of the power supplying helical coils 7a, 7b is degraded when the power receiving helical coil 8 is moved away from them. By using this, the CPU 11 detects the coil of which reflective wave detected by either of the reflective wave detectors 16a, 16b is smallest as the adjacent coil. Specifically, the CPU 11 works as a second power supplying device. In the first procedure, the CPU 11 sequentially turns on the switch 10a, 10b with time interval to sequentially supply electric power to the power supplying helical coils 7a, 7b. At this time, the CPU 11 detects the coil of which reflective wave level detected by either of the reflective wave detectors 16a, 16b is the smallest as the adjacent coil, and controls switches 10a, 10b so as to supply electric power to only the detected adjacent coil.

Then, the CPU 11 monitors the reflective wave of the adjacent coil, and when the reflective wave is below the specific level, the CPU 11 stop supplying the electric power to the adjacent coil, sequentially turns on the switch 10a, 10b with time interval to sequentially supply electric power to the power supplying helical coils 7a, 7b in a short time. Then, similar to the first procedure, the CPU 11 detects the coil of which reflective wave level detected by either of the reflective wave detectors 16a, 16b is the smallest as the adjacent coil, and controls switches 10a, 10b so as to supply electric power to only the detected adjacent coil. Then, these procedures are repeated.

According to the third embodiment described above, the CPU 11 detects the coil of which reflective wave level detected by either of the reflective wave detectors 16a, 16b is the smallest as the adjacent coil among the two power supplying helical coils 7a, 7b. Therefore, the adjacent coil can be detected without transmitting signal to the power receiving helical coil 8 periodically. Therefore, the electric power can be supplied from the power supplying section 3 to the power receiving section 5 with higher efficiency.

Fourth Embodiment

Figure 7:
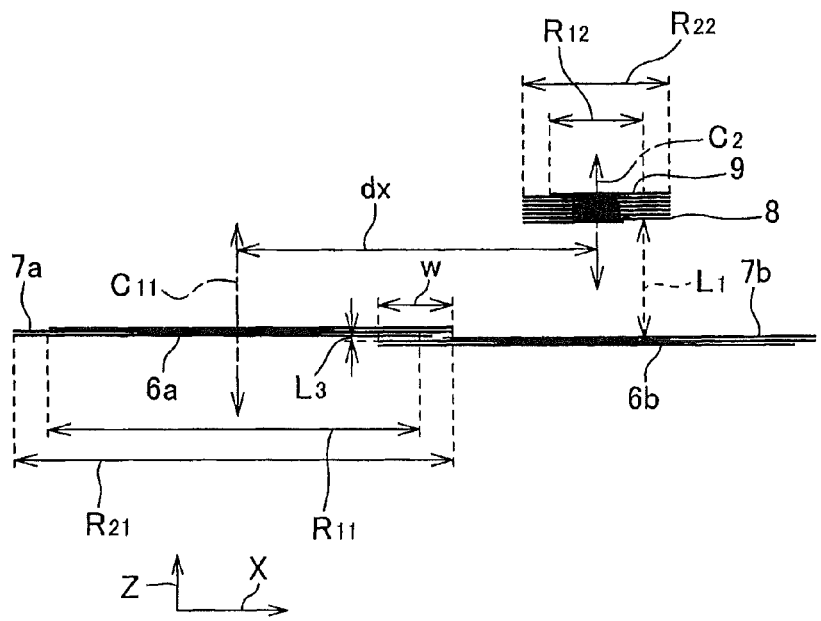
FIG. 7 is a side view showing a power supplying section and a power receiving section defining a power supplying system according to a fourth embodiment.

Next, a fourth embodiment will be explained. In the first to third embodiments described above, the power supplying helical coils 7a, 7b are separated from each other. In the fourth embodiment, as shown in FIG. 7, the power supplying helical coils 7a, 7b are partially overlapped with each other. In this way, when the power supplying helical coils 7a, 7b are partially overlapped with each other, the reduction of the transmission efficiency at the point where the power supply destination from the AC source V is switched from the power supplying loop antenna 6a to the power supplying loop antenna 6b is prevented.

Figure 8:
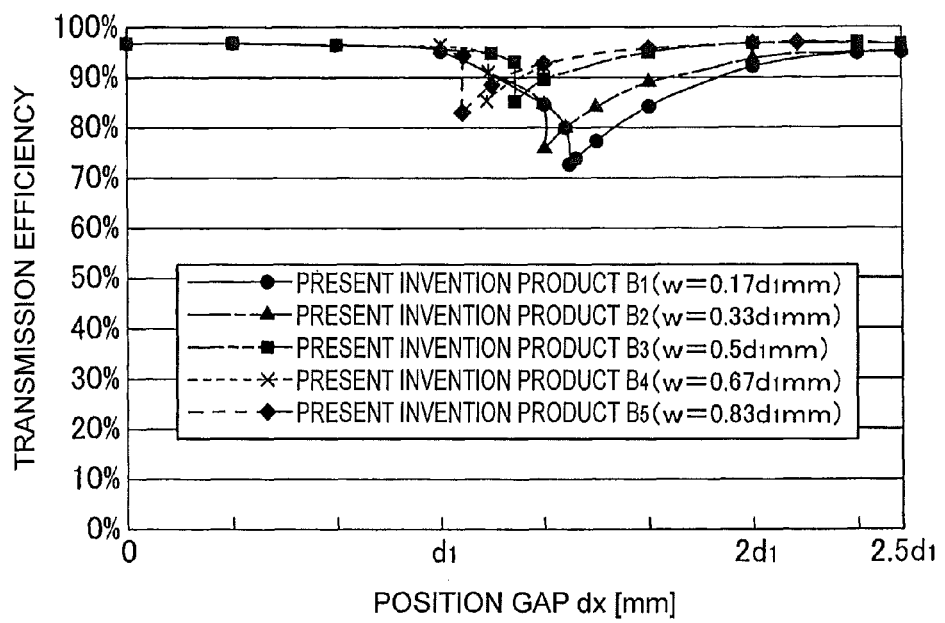
FIG. 8 is a graph showing transmission efficiency of present invention products $B_1$ to $B_5$ respectively having $0.17d_1$ mm, $0.33d_1$ mm, $0.5d_1$ mm, $0.67d_1$ mm, $0.83d_1$ mm of overlapping widths w of two power supplying helical coils shown in FIG. 7 when the gap dx between central axes $C_{11}$, $C_2$ is varied in a range from 0 mm to $2.5d_1$ mm.

Next, the present inventors simulate the transmission efficiency from the power supplying helical coils 7a, 7b to the power receiving helical coil 8 when the gap dx between the central axes $C_{11}$, $C_2$ in the arranging direction X is varied in a range from 0 to $2.5d_1$ mm with respect to the present invention products $B_1$ to $B_5$ of which overlapping widths w are different from each other in the power supplying system 1 shown in FIG. 7 to confirm an effect. The result is shown in FIG. 8.

Incidentally, the overlapping width w of the present invention product $B_1=0.17d_1$ mm, w of the present invention product $B_2=0.33d_1$ mm, w of the present invention product $B_{3=0.5}d_1$ mm, w of the present invention product $B_{4=0.67}d_1$ mm, w of the present invention product $B_{5=0.83}d_1$ mm. Further, the point x where the power supply destination from the AC source V is switched from the power supplying loop antenna 6a to the power supplying loop antenna 6b of the present invention product $B_1=1.42\ d_1$ mm, x of the present invention product $B_{2=1.34}\ d_1$ mm, x of the present invention product $B_{3=1.26}\ d_1$ mm, x of the present invention product $B_4=1.17\ d_1$ mm, x of the present invention product $B_{5=1.09}\ d_1$ mm. Further, the power supplying loop antennas 6a, 6b, the power supplying helical coils 7a, 7b, the power receiving helical coil 8, the power receiving loop antenna 9 of the present invention product $B_1$ to $B_5$ are the same as the present invention product A. The distance $L_3$ between the power supplying helical coils 7a, 7b in the axis direction $Z=0.017d_1$ mm.

As shown in FIG. 3, in the first embodiment described above, the transmission efficiency is the smallest at the point $dx=1.5d_1$ mm where the power supply destination from the AC source V is switched from the power supplying loop antenna 6a to the power supplying loop antenna 6b, and is 65.6%. In contrast, as shown in FIG. 8, by providing the overlapping width w, the transmission efficiency becomes more than 70%. Specifically, as shown in FIG. 8, in the fourth embodiment, until $0.5d_1$ mm, the reduction of the transmission efficiency around the switching point is decreased as the overlapping width w becomes larger. However, it is found that the reduction of the transmission efficiency in the overlapping width $w=0.83d_1$ mm is larger than that in the overlapping width $w=0.5d_1$ mm.

Specifically, in the present invention product A shown in the first embodiment, the transmission efficiency at the switching point where the transmission efficiency is the smallest is 65.6%. In contrast, in a case of $w=0.5d_1$ mm, the transmission efficiency at the switching point where the transmission efficiency is the smallest is 85.3%, and it is found that the efficiency is increased by nearly 20%. Further, when the overlapping width w is too large, the high transmission efficiency area opposite to the gap dx is reduced. Therefore, this is not a good idea. Accordingly, the overlapping width w has an optimum value, and in the fourth embodiment, is set in a range $0.5d_1$ mm to $0.67d_1$ mm.

Fifth Embodiment

Figure 9:
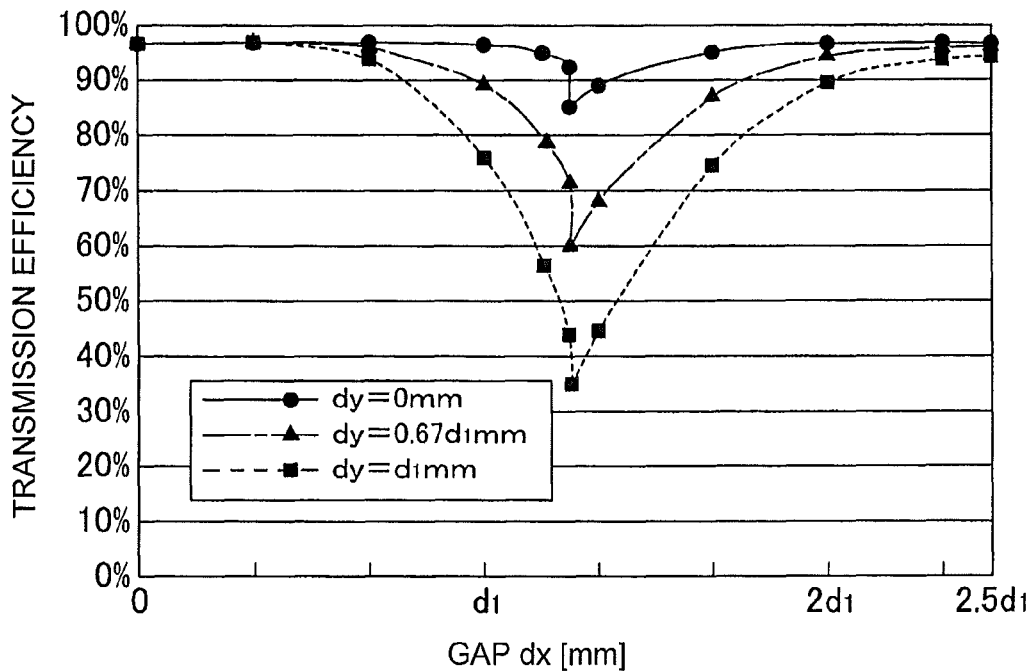
FIG. 9 is a graph showing transmission efficiency of present invention product $B_2$ of which overlapping width w of the power supplying helical coil=$0.5d_1$ mm, while the gap dy of the central axes $C_{11}$, $C_2$ is fixed to 0 mm, $0.67d_1$ mm, $d_1$ mm, when the gap dx is varied in a range from 0 mm to $2.3d_1$ mm.

Next, the present inventors simulated the transmission efficiency of the present invention product $B_3$ ($w=0.5d_1$ mm) shown in FIG. 7 when the gap dx is varied in a range from 0 mm to $2.3d_1$ mm, while the gap dy in a crossing direction Y (FIG. 2) perpendicular to both the arranging direction X and the axial direction Z is respectively fixed to 0 mm, $0.67d_1$ mm, and $d_1$ mm. The result is shown in FIG. 9. As shown in FIG. 9, when the gap dy=0 mm, the lowest transmission efficiency=85.3%. In contrast, when the gap $dy=d_1$ mm, the lowest transmission efficiency is 35.7%, and a significant efficiency reduction is generated.

Figure 10:
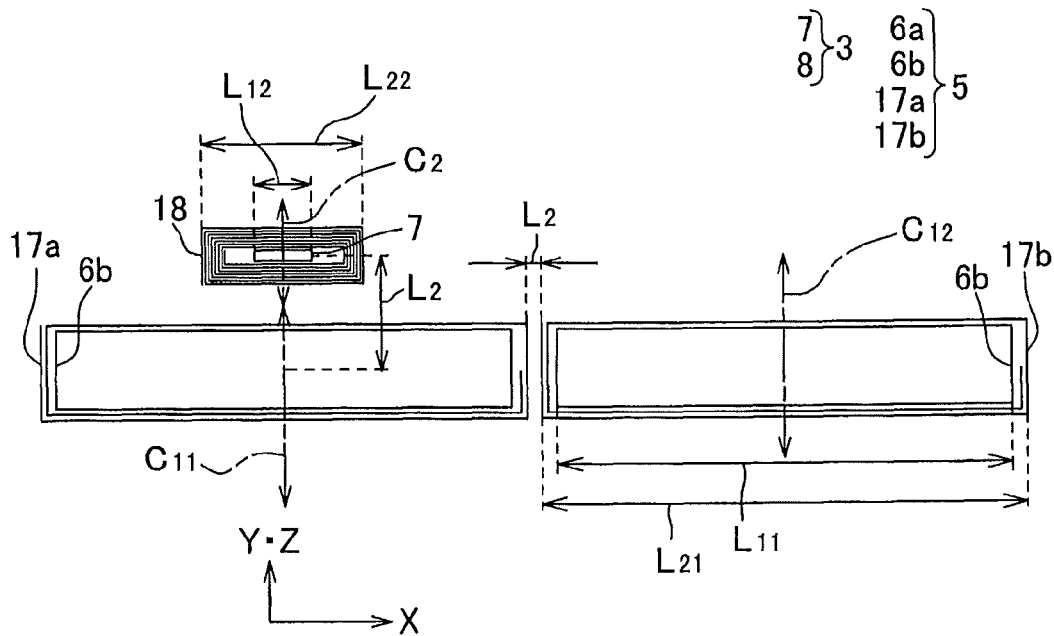
FIG. 10 is a perspective view showing a power supplying section and a power receiving section defining a power supplying system according to a fifth embodiment of the present invention.
Figure 11:
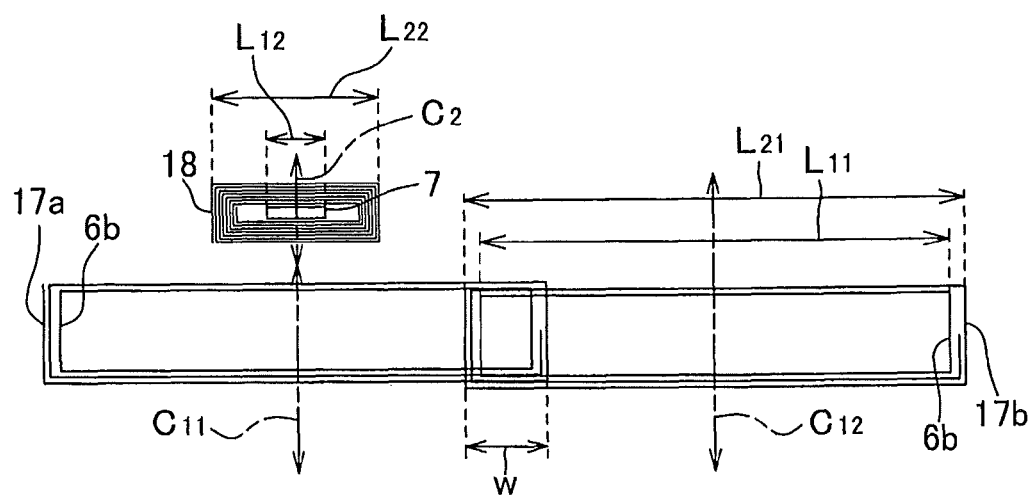
FIG. 11 is a perspective view showing a power supplying section and a power receiving section defining a power supplying system according to a fifth embodiment of the present invention.

In this way, in the above first to fourth embodiments, the power supplying helical coils 7a, the power receiving helical coil 8 formed by winding the wire in a helical shape are used as the power supplying coil and the power receiving coil. In the fifth embodiment, as shown in FIGS. 10 and 11, the power supplying spiral coils 17a, 17b, and the power receiving spiral coil 18 formed by winding the wire in a spiral shape on a plane such as a substrate are used as the power supplying coil and the power receiving coil. These power supplying spiral coils 17a, 17b, and the power receiving spiral coil 18 are wound in a square shape. The power supplying loop antennas 6a, 6b and the power receiving loop antenna 9 are also formed in a scare loop shape. The power supplying spiral coils 17a, 17b may be separated from each other as shown in FIG. 10, or may be overlapped with each other as shown in FIG. 11.

According to the above fifth embodiment, the reduction of the transmission efficiency caused by the gap between the central axes C11, C 12, and C2 in both the arranging direction X and the crossing direction Y of the power supplying spiral coils 17a, 17b and the power receiving spiral coil 18 can be suppressed.

Figure 12:
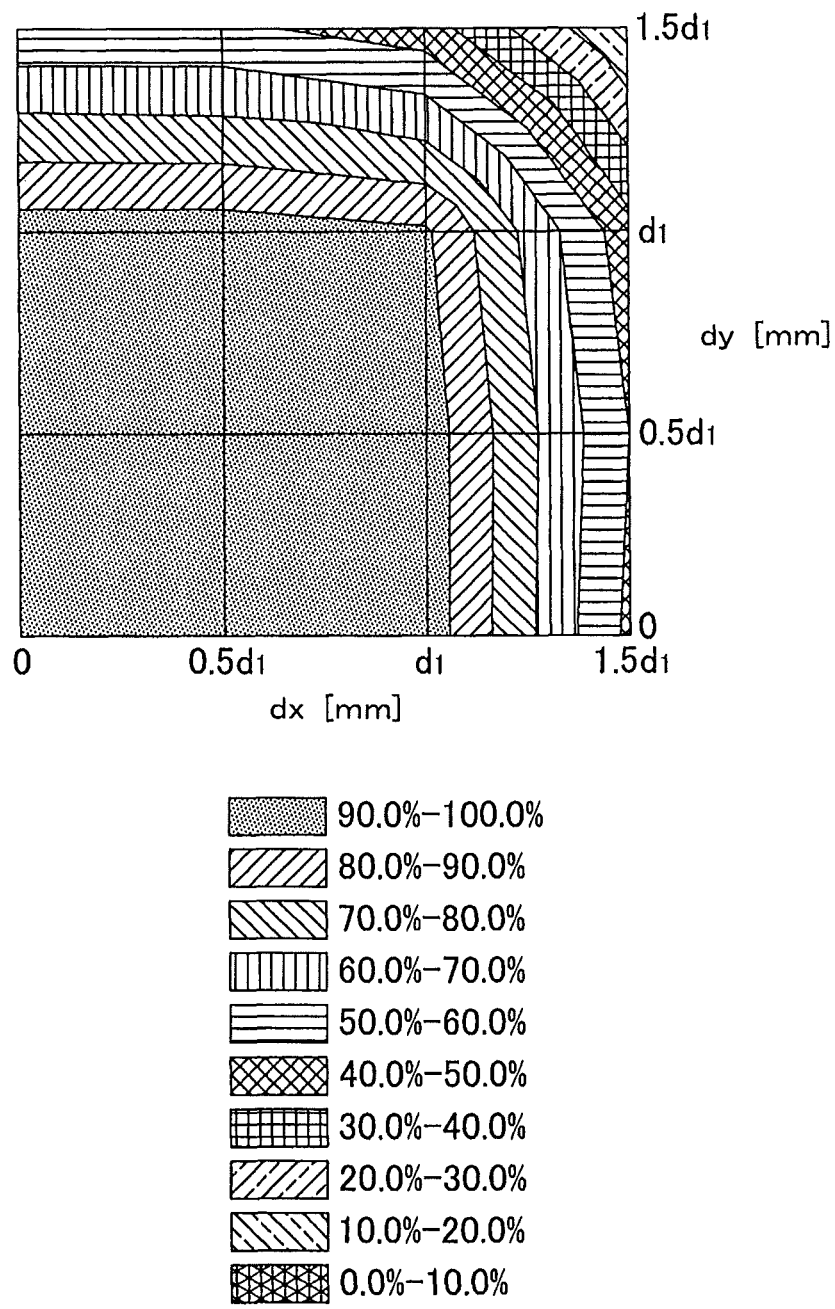
FIG. 12 is a graph showing a relationship between gaps (dx, dy) of the central axes $C_{11}$, $C_2$ of the reference product and the transmission efficiency.
Figure 18:
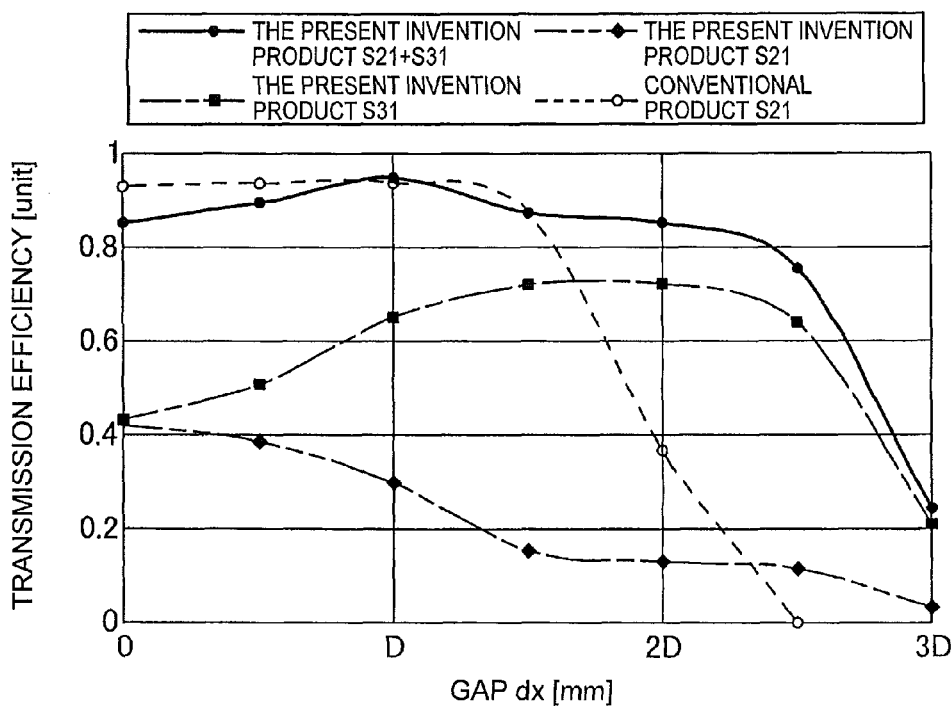
FIG. 18 is a graph showing a simulation result of the transmission efficiency S21 of the conventional product B, the transmission efficiency S21, S31, (S21+S31) of the present invention product with respect to the gap d.

Next, the present inventors simulated the transmission efficiency from the power supplying spiral coils 17a, 17b to the power receiving spiral coil 18 in a reference product having one power supplying spiral coil, and one power supplying loop antenna, when the gaps (dx, dy) between the central axes $C_{11}$, $C_2$ on XY plane of the above power receiving spiral coil 18 are varied in a range $0\ mm \leq dx \leq 1.5d_1$ mm, $0 \leq dy \leq 1.5d_1$ mm. The result is shown in FIG. 12. In the conventional product shown in FIG. 16, as shown in FIG. 18, a distribution of the transmission efficiency is in a concentric circle shape centering around the gaps (dx, dy)=(0 mm, 0 mm). In contrast, in the reference product, as shown in FIG. 12, the distribution of the transmission efficiency is in substantially a square shape, and the high efficiency area of the reference product is wider than that of the conventional product.

Further, the present inventors simulated the transmission efficiency from the power supplying spiral coils 17a, 17b to the power receiving spiral coil 18 of the present invention products $C_1$, $C_2$ having different distance $L_2$ in the power supplying system 1 shown in FIG. 10 when the gap dx is varied in a range 0 mm to $2.5d_1$ mm. Further, the present inventors simulated the transmission efficiency from the power supplying spiral coils 17a, 17b to the power receiving spiral coil 18 of the present invention products $D_1$, to $D_4$ having different overlapping width w in the power supplying system 1 shown in FIG. 11 when the gap dx is varied in a range 0 mm to $2.5d_1$ mm. The result is shown in FIG. 13.

Incidentally, in the present invention products $C_1$, $C_2$, $D_1$ to $D_4$, the power supplying loop antennas 6a, 6b are equal to each other, and one side $L_{11}$ is $2.79d_1$ mm. The power supplying spiral coils 17a, 17b are also equal to each other, and one side $L_{21}$ is $3d_1$ mm which is the same as the diameter $R_{21}$ of the power supplying helical coils 7a, 7b of the present invention products A, B. One side L12 of the power receiving spiral coil 18 is also $d_1$ mm which is the same as the diameter $R_{22}$ of the power receiving helical coil 8 of the present invention products A, B. One side $L_{12}$ of the power receiving loop antenna 9 is $0.35d_1$ mm. Further, the distance $L_2$ is fixed to $0.67d_1$ mm.

Figure 13:
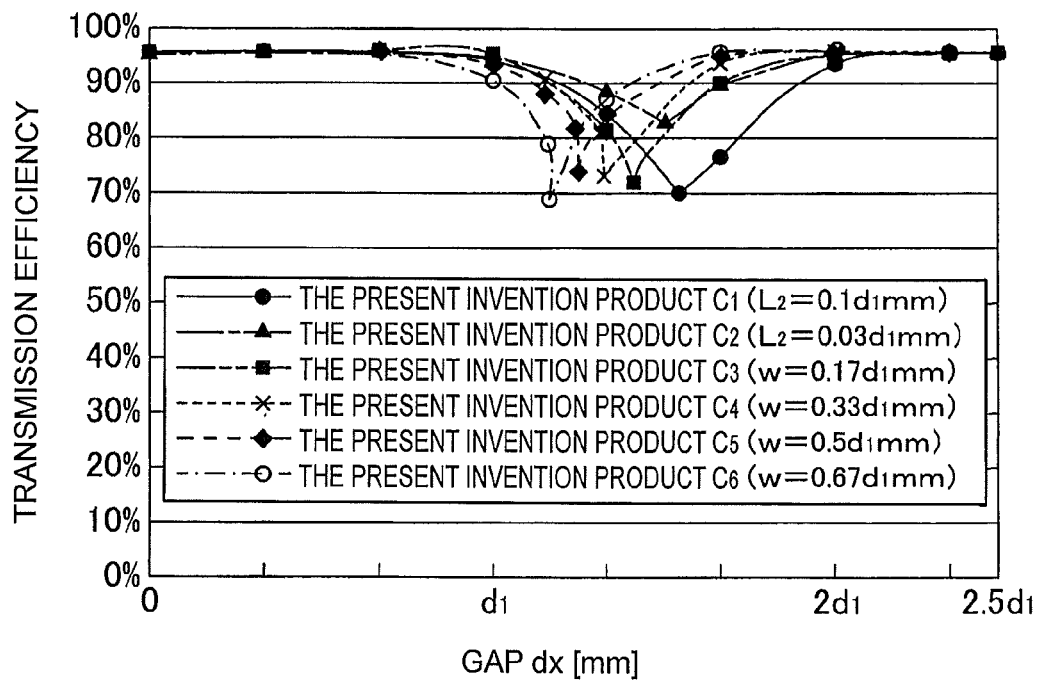
FIG. 13 is a graph showing the transmission efficiency of the present invention products $C_1$, $C_2$ in which a distance $L_2$ between two power supplying spiral coils shown in FIG. 10 is $0.1d_1$ mm, $0.03d_1$ mm, and of the present invention products $D_1$ to $D_4$ in which the overlapping width w between the two power supplying spiral coils is $0.17d_1$ mm, $0.33d_1$ mm, $0.5d_1$ mm, $0.67d_1$ mm, when the gap dx between the central axes C11, C2 is varied in a range from 0 to $2.5d_1$ mm.

As is clear from FIG. 13, the transmission efficiency of any of the present invention products $C_1$, $C_2$, $D_1$ to $D_5$ is more than 70%. In particular, the minimum transmission efficiency of the present invention product $C_1$ is 83%, which is the highest efficiency.

Figure 14:
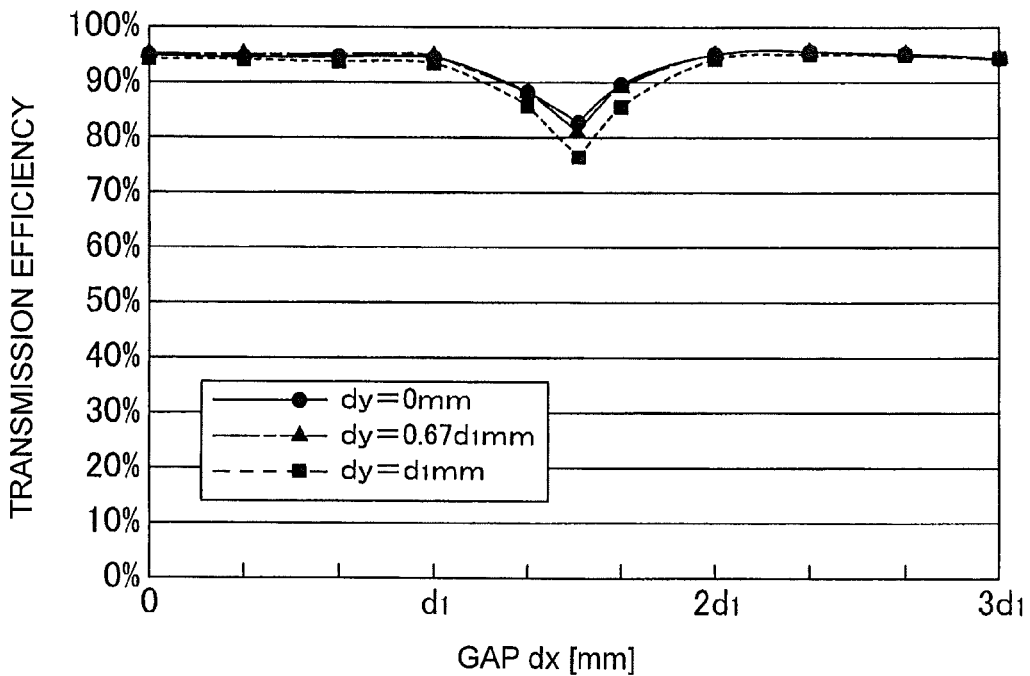
FIG. 14 is a graph showing the transmission efficiency of the present invention product $C_1$ in which the distance $L_2$ between two power supplying spiral coils shown in FIG. 10 is $0.03d_1$ mm, while the gap dy between two central axes $C_{11}$, $C_2$ is fixed to 0 mm, $0.67d_1$ mm, $d_1$ mm, when the gap dx is varied in a range from 0 mm to $3d_1$ mm.

Next, the present inventors simulated the transmission efficiency of the present invention product $C_1$ ($L_2=0.03d_1$ mm) when the gap dx is varied in a range 0 mm to $2.3d_1$ mm while the gap dy is respectively fixed to 0 mm, $0.67d_1$ mm. and $d_1$ mm, and confirmed the effect of the present invention. The result is shown in FIG. 14. As shown in FIG. 9, in the present invention product $B_2$, at a position $dx=1.24d_1$ mm where the transmission efficiency is the lowest, when the gap dy=0 mm, the transmission efficiency is 85.3%, when the gap $dy=0.67d_1$ mm, the transmission efficiency is 60.4%, when the gap $dy=d_1$ mm, the transmission efficiency is 35.7%. Thus, owing to the gap y in the crossing direction, a significant efficiency reduction is generated. In contrast, as shown in FIG. 14, in the present invention product $C_1$, at the point $dx=1.5d_1$ mm where the transmission efficiency is the lowest, when the gap dy=0 mm, the transmission efficiency is 82.9%, when the gap $dy=0.67d_1$ mm, the transmission efficiency is 81.5%, when the gap $dy=d_1$ mm, the transmission efficiency is 76.7%. Thus, the reduction of the transmission efficiency is further suppressed.

According to the above fifth embodiment, the power supplying spiral coils 17a, 17b, and the power receiving spiral coil 18 are formed in a rectangular spiral shape, and the two power supplying spiral coils 17a, 17b are separated from each other in the same plane. Thereby, in the X-Y plane perpendicular to the axis direction of the two power supplying spiral coils 17a, 17b, the reduction of the transmission efficiency caused by the gaps between the central axes C11, C12, and C2 in both the arranging direction of the power supplying spiral coils 17a, 17b, and the direction perpendicular to this arranging direction can be suppressed.

Incidentally, according to the above first to fifth embodiments, two power supplying coils are arranged. However, the present invention is not limited to this. Three power supplying coils may be arranged. Further, many power supplying coils may be arranged alternately so that the high transmission efficiency area may be further increased. Further, by arranging the power supplying coils in a planar manner other than linearly, the electric power can be transmitted corresponding to the planar movement of the power receiving coil.

Sixth Embodiment

Figure 15:
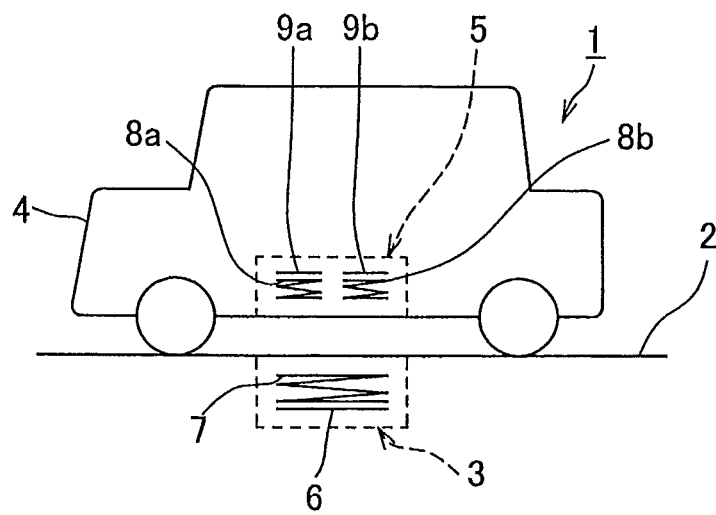
FIG. 15 is a schematic view showing one example of a power supplying system according to a sixth embodiment of the present invention.
Figure 16A:
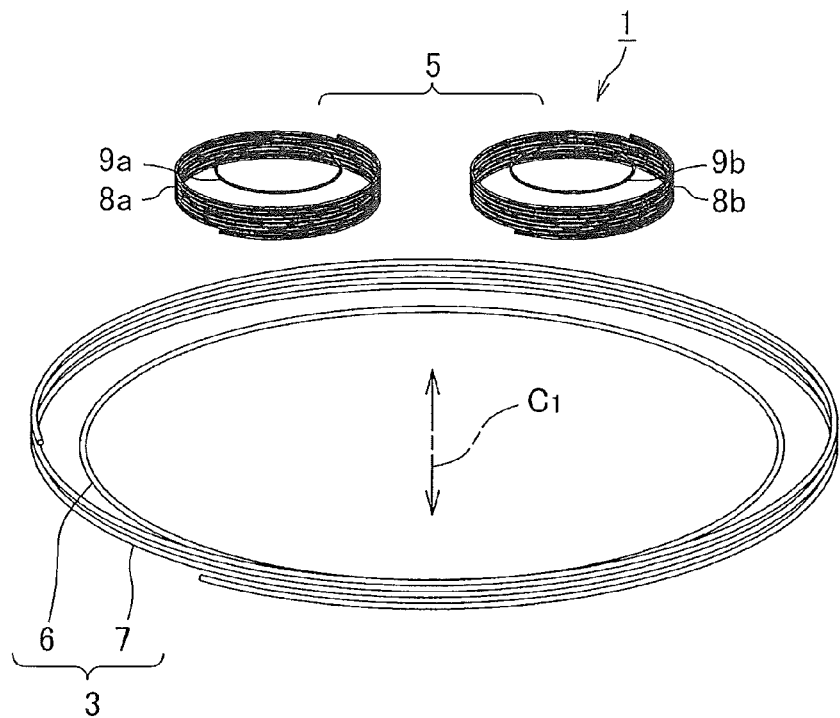
FIG. 16A is a perspective view showing a configuration of the power supplying system shown in FIG. 15.
Figure 16B:
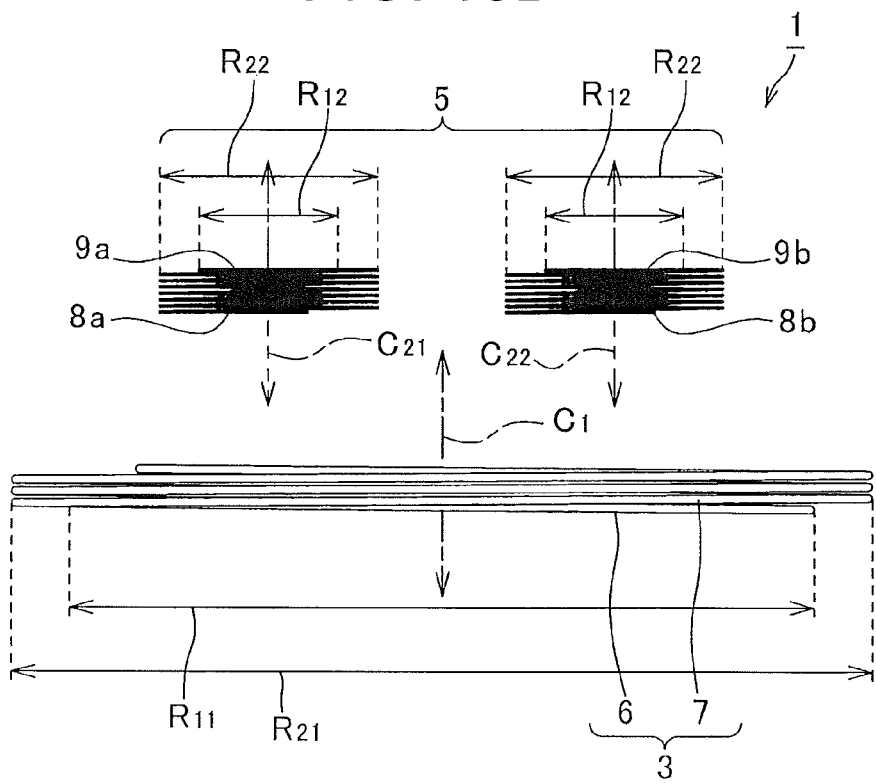
FIG. 16B is a side view showing a configuration of the power supplying system shown in FIG. 15.
Figure 17:
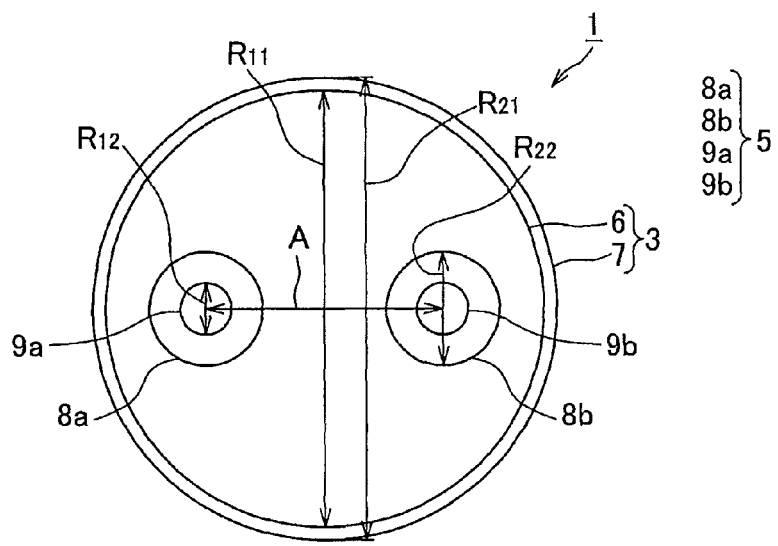
FIG. 17 is a top view showing a configuration of the power supplying system shown in FIG. 15.

Hereinafter, the power supplying system according to a sixth embodiment of the present invention will be explained with reference to FIGS. 15 to 17. FIG. 15 is a schematic view showing one example of a power supplying system according to the present invention. FIG. 16A is a perspective view showing a configuration of the power supplying system shown in FIG. 15. FIG. 16B is a side view showing a configuration of the power supplying system shown in FIG. 15. FIG. 17 is a top view showing a configuration of the power supplying system shown in FIG. 15. As shown in FIG. 15, a power supplying system 1 includes: a power supplying section 3 provided on a road 2 or the like; and a power receiving section 5 provided on a belly portion or the like of a vehicle 4.

As shown in FIGS. 15 to 17, the power supplying section 3 is provided with a power supplying loop antenna 6 to which the electric power is supplied, and a power supplying helical coil 7 (power supplying coil) arranged opposite to the power supplying loop antenna 6 with a gap in an axial direction of the power supplying loop antenna 6 and electromagnetically bonded to the power supplying loop antenna 6. This power supplying loop antenna 6 is formed in a circular loop shape, and the central axis $C_1$ thereof is arranged in a direction from the road 2 toward the belly portion of the vehicle 4, namely, a vertical direction. AC power from a not-shown AC power source is supplied to the power supplying loop antenna 6.

The power supplying helical coil 7 is made by, for example, winding a wire in a circular helical shape of which diameter is larger than a diameter of the power supplying loop antenna 6. Further, the power supplying helical coil 7 is arranged at the vehicle 4 side of the power supplying loop antenna 6, and coaxially with the power supplying loop antenna 6. In this embodiment, the power supplying loop antenna 6 is arranged in the same plane as the wound wire furthest away from the vehicle 4 of the power supplying helical coil 7.

Thereby, the power supplying loop antenna 6 and power supplying helical coil 7 are provided separated from each other, and the power within a range that they can be electromagnetically coupled together, namely, within a range that when the AC power is supplied to the power supplying loop antenna 6, electromagnetic induction is generated in the power supplying helical coil 7.

The power receiving section 5 is provided with two power receiving helical coils 8a, 8b arranged opposite to the power supplying helical coil 7 with a gap in their central axes direction to electromagnetically resonate, and two power receiving loop antennas 9a, 9b arranged respectively opposite to the power receiving helical coils 8a, 8b in the central axes direction thereof to be electromagnetically coupled to the power receiving helical coils 8a, 8b.

A not-shown load such as on-vehicle battery is connected to the power receiving loop antennas 9a, 9b. The sum of the electric power supplied to the power receiving loop antennas 9a, 9b is supplied to this load. Further, the power receiving loop antennas 9a, 9b are formed in a circular loop shape, and their central axes $C_{21}$, $C_{2s}$ are arranged in a direction from the belly portion of the vehicle 4 toward the road 2, namely, a vertical direction. Further, the power receiving loop antennas 9a, 9b are equal to each other, and the diameters thereof are smaller than the diameter of the power supplying loop antenna 6.

The power receiving helical coils 8a, 8b are equal to each other, and formed by winding a wire in a circular helical shape of which diameter is smaller than the diameter of the power supplying helical coil 7, and larger than the diameters of the power receiving loop antennas 9a, 9b. Namely, the diameter of the power supplying helical coil 7 is formed larger than the diameters of the power receiving helical coils 8a, 8b. Further, the power receiving helical coils 8a, 8b are respectively arranged at the road 2 side of the power receiving loop antennas 9a, 9b and coaxially with the power receiving loop antennas 9a, 9b. In this embodiment, the power receiving loop antennas 9a, 9b are arranged in the same plane as the wound wires furthest away from the road 2 of the power receiving helical coils 8a, 8b.

Thereby, the power receiving loop antenna 9a and the power receiving helical coil 8a, and the power receiving loop antenna 9b and the power receiving helical coil 8b are respectively provided separated from each other within a range that they can be electromagnetically coupled together, namely, within a range that when the AC power is supplied to the power receiving helical coil 8a, 8b, electromagnetic induction is generated in the power receiving loop antennas 9a, 9b. Further, the above power receiving helical coils 8a, 8b are arranged in the same plane and separated from each other.

According to the above power supplying system 1, when the vehicle 4 is moved close to the power supplying section 3, and the power supplying helical coil 7 become opposite to the power receiving helical coils 8a, 8b in the central axes direction with a gap, the power supplying helical coil 7 and the power receiving helical coils 8a, 8b electromagnetically resonate so that the electric power is supplied from the power supplying section 3 to the power receiving section 5 in a contactless manner.

To explain specifically, when the AC current is supplied to the power supplying loop antenna 6, this electric power is transmitted to the power supplying helical coil 7 by electromagnetic induction. Namely, the electric power is supplied to the power supplying helical coil 7 via the power supplying loop antenna 6. When the electric power is transmitted to the power supplying helical coil 7, the electric power is transmitted to the power receiving helical coils 8a, 8b wirelessly by resonance of magnetic field. Further, when the electric power is transmitted to the power receiving helical coils 8a, 8b, the electric power is transmitted to the power receiving loop antennas 9a, 9b by electromagnetic induction, and supplied to the load connected to the power receiving loop antennas 9a, 9b.

According to the above power supplying system 1, by providing a plurality of the power receiving helical coils 8a, 8b and the power receiving loop antennas 9a, 9b, the reduction of transmission efficiency caused by the gap between the central axis $C_1$ of the power supplying helical coil 7 and the central axes $C_{21}$ and $C_{22}$ of the power receiving helical coils 8a, 8b can be suppressed. Therefore, the electric power can be supplied from the power supplying section 3 to the power receiving section 5 with high efficiency.

Figure 25A:
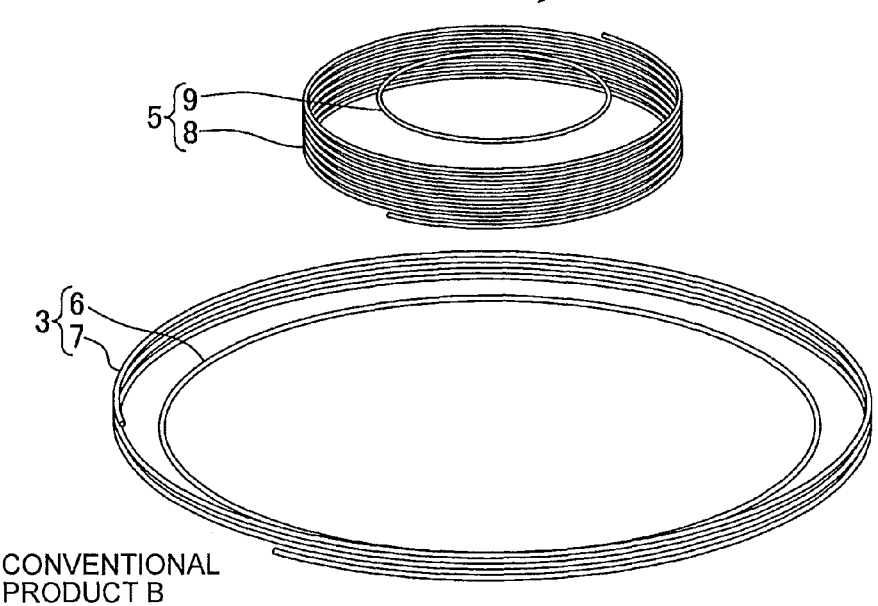
FIG. 25A is a perspective view showing one example of the conventional power supplying system.
Figure 25B:
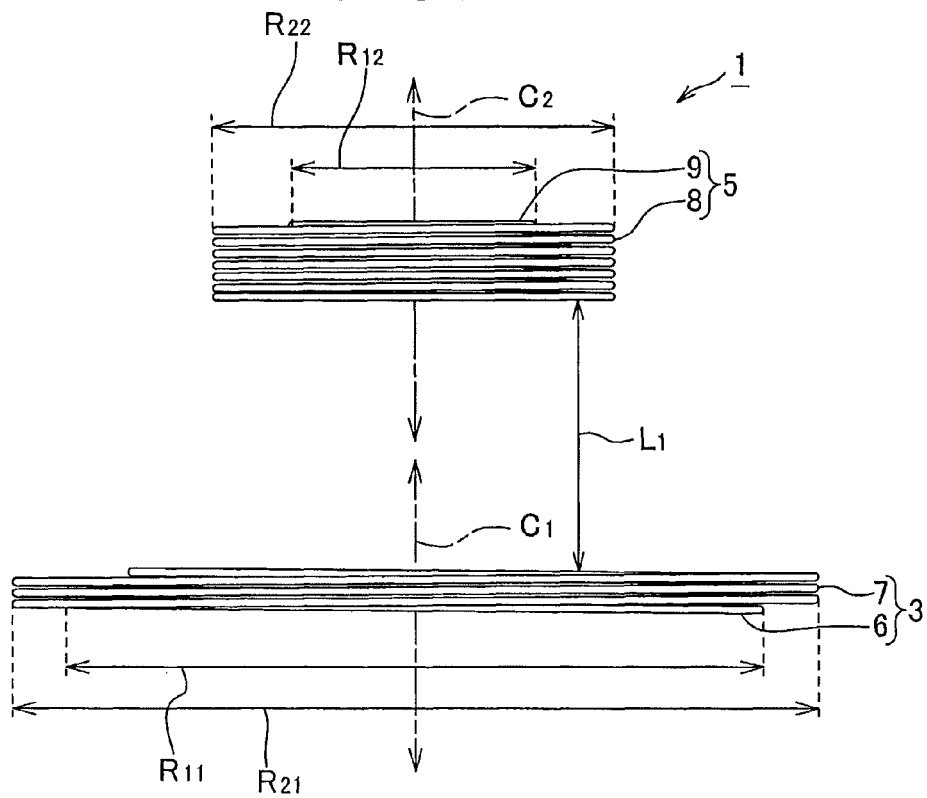
FIG. 25B is a side view showing one example of the conventional power supplying system.
Figure 26:
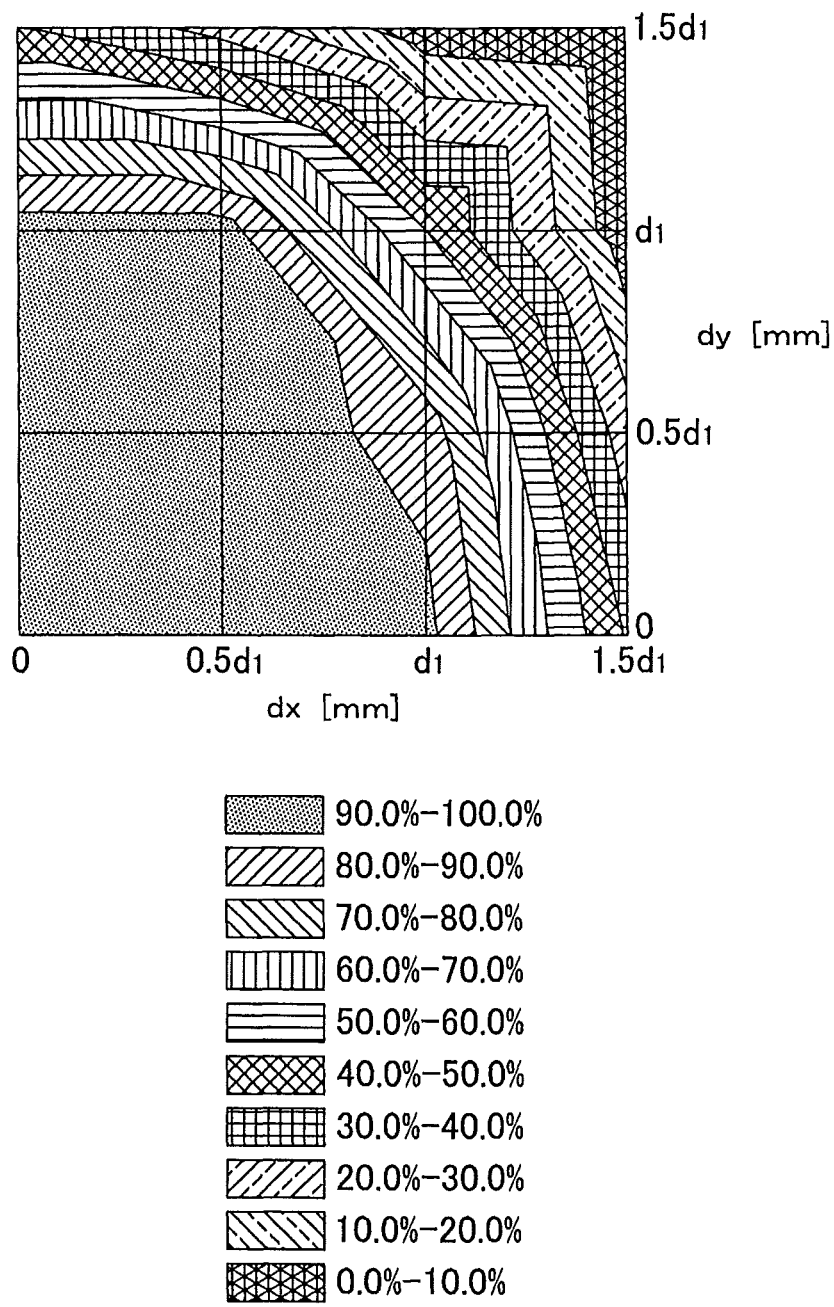
FIG. 26 is a graph showing a relationship between the gaps (dx, dy) of the central axes C1, C2 of the conventional product shown in FIG. 25 and the transmission efficiency.

Next, the present inventors simulated the transmission efficiency S21 from the power supplying helical coil 7 to the power receiving helical coil 8 of a conventional product B as the power supplying system 1 shown in FIGS. 25A and 15B when the gap dx between the central axes $C_1$ and $C_2$ is varied within a range from 0 mm to 3D mm. Further, the present inventors simulated the transmission efficiency S21 from the power supplying helical coil 7 to the power receiving helical coil 8a, the transmission efficiency S31 from the power supplying helical coil 7 to the power receiving helical coil 8b, and the sum S21+S31 of the transmission efficiency from the power supplying helical coil 7 to the power receiving helical coils 8a, 8b of the present invention product as the power supplying system 1 shown in FIGS. 15 to 17 when the gap d between the central axis $C_1$ and the central axes $C_{21}$ and $C_{22}$ is varied within a range from 0 mm to 3D mm to confirm an effect of the present invention. The result is shown in FIG. 18.

Figure 19:
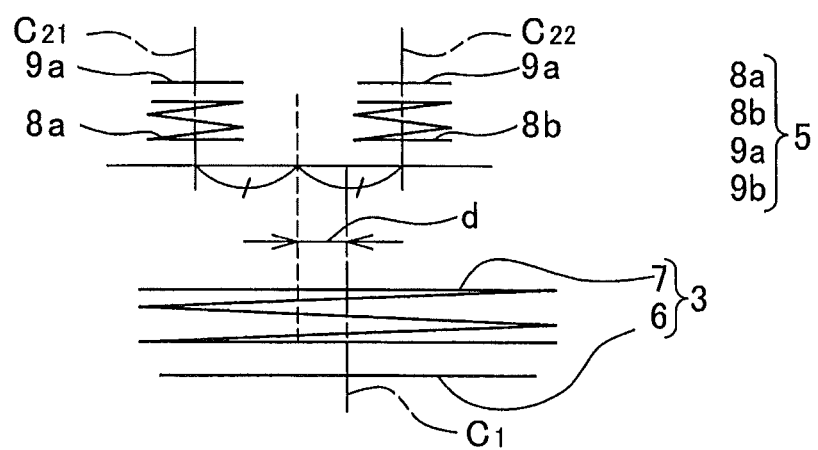
FIG. 19 is an explanatory view for explaining a gap d in the power supplying system shown in FIG. 15.

Incidentally, in the above present invention product, as shown in FIG. 19, the gap d between the center of two central axes $C_{21}$ and $C_{22}$ and the central axis $C_1$. Further, the power supplying helical coil 7 is the same in both the conventional product B and the present invention product, and the diameter $R_{21}$ thereof=4D mm. The power receiving helical coils 8, 8a, 8b are equal to each other, and the diameter $R_{22}$ thereof=D mm. Further, in the present invention product, the distance A between the central axes $C_{21}$ and $C_{22}$ is fixed to 2D mm.

As shown in FIG. 18, in comparison with the transmission efficiency S21 of the conventional product B indicated by dot line, the reduction of the transmission efficiency (S21+S31) of the present invention product indicated by solid line caused by the gap d is suppressed. To explain specifically, in the conventional product B, the high transmission efficiency S21 is maintained in a range that the gap d is within 1.33D mm, however, when the gap d is more than 1.33D mm, the transmission efficiency S21 is drastically decreased. In contrast, in the present invention product, the range of the gap d able to maintain the high transmission efficiency (S21+S31) is expanded from the above 1.33D mm to 2.33D mm.

Further, as is clear from FIG. 18, when the gap d is 0 mm, the energy emitted from the power supplying helical coil 7 is equally transmitted to the two power receiving helical coils 8a, 8b. As the gap d is increased, the transmission amount to the power receiving helical coil 8a is increased, and the transmission amount to the power receiving helical coil 8b is deceased.

Incidentally, regarding a combining method of the transmission efficiency S21 of the power receiving helical coil 8a and the transmission efficiency S31 of the power receiving helical coil 8b, when the electric power is outputted as DC power, an AC/DC converter for converting the AC power transmitted to the power receiving loop antennas 9a, 9b into DC power is further provided, and to combine DC powers converted by the AC/DC converter with each other is a simple realistic method.

In contrast, when the AC powers transmitted to the power receiving loop antennas 9a, 9b are combined, there is a fear that the AC powers may be attenuated by each other due to a phase difference between two Ac powers, and a loss may be generated. However, as long as the wavelength of the AC power is extremely larger than the gap d, and a loss clue to the phase difference is not a problem, the AC powers transmitted to the power receiving loop antennas 9a, 9b may be combined. In this embodiment, the frequency of the AC power is fixed to f0 MHz. Because f0 is about 10 MHz, the wavelength is about 30 mm and the phase difference caused by the gap D mm is not a problem.

Figure 20A:
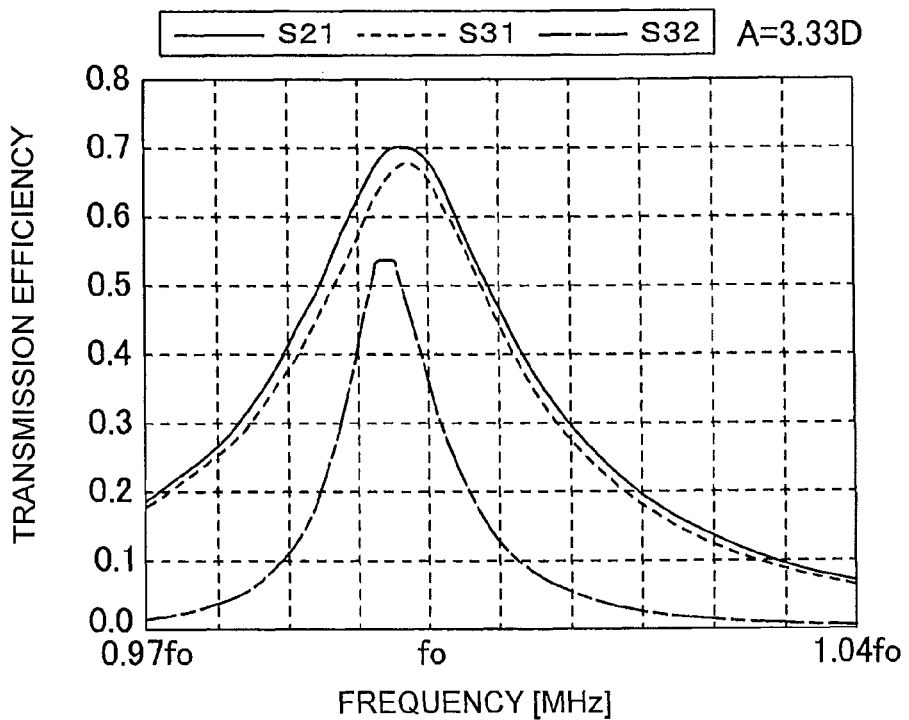
FIG. 20A is a graph showing the transmission efficiency S21, S31, S32 of the present invention product with the gap d=0 mm, the distance A=3.3D mm with respect to the frequency of the alternating current.
Figure 20B:
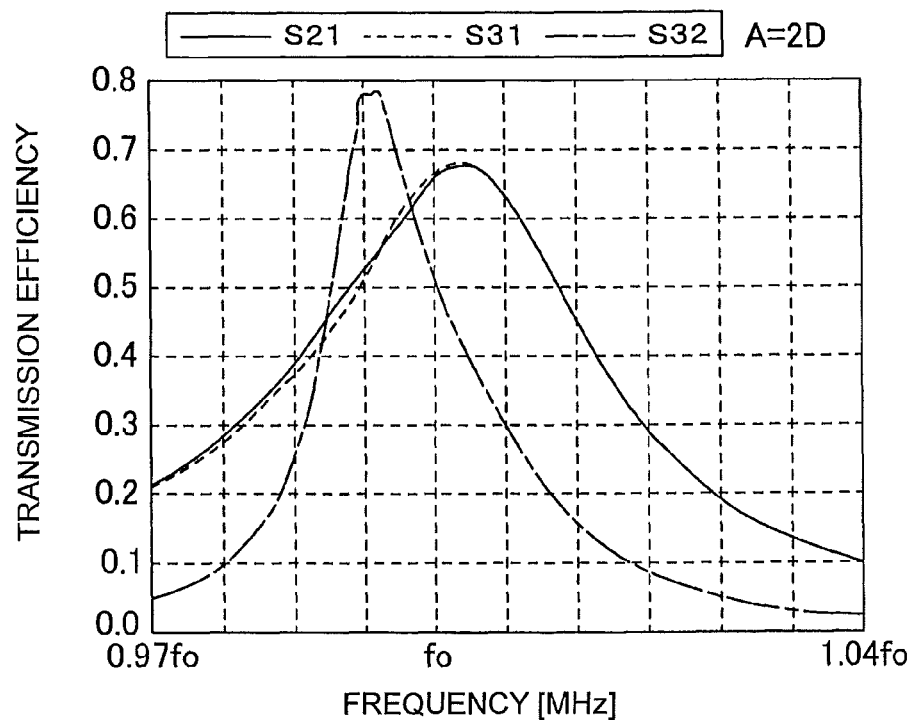
FIG. 20B is a graph showing the transmission efficiency S21, S31, S32 of the present invention product with the gap d=0 mm, the distance A=2D mm with respect to the frequency of the alternating current.
Figure 21:
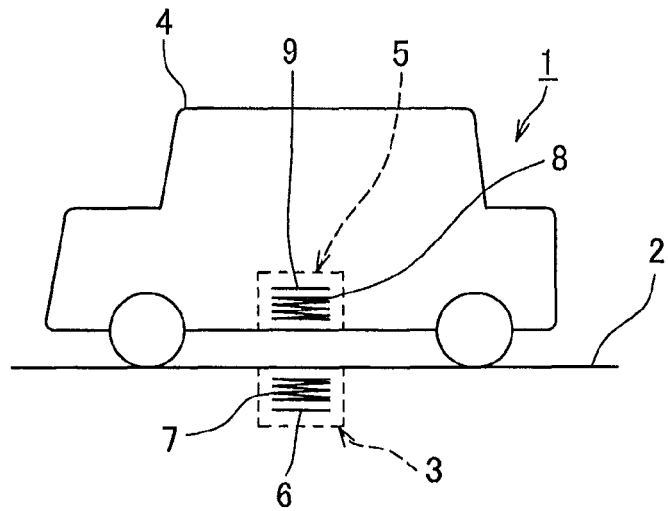
FIG. 21 is a schematic view showing one example of a conventional power supplying system.
Figure 22A:
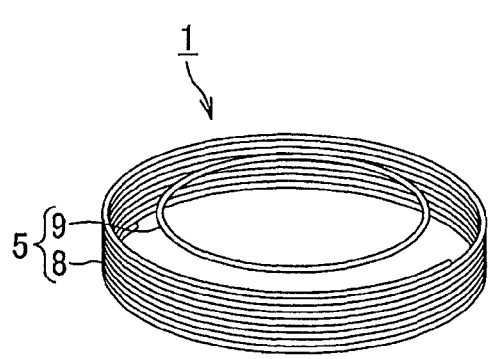
FIG. 22A is a perspective view showing a configuration of the power supplying system shown in FIG. 21.
Figure 22B:
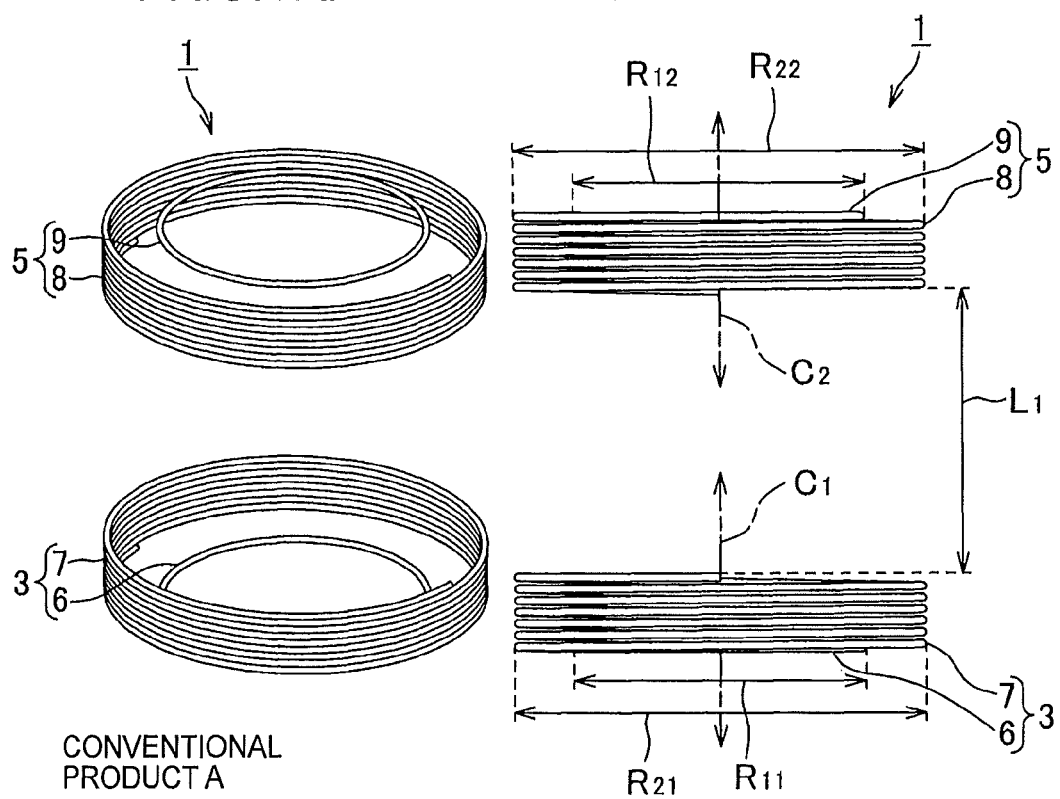
FIG. 22B is a side view showing a configuration of the power supplying system shown in FIG. 21.
Figure 23:
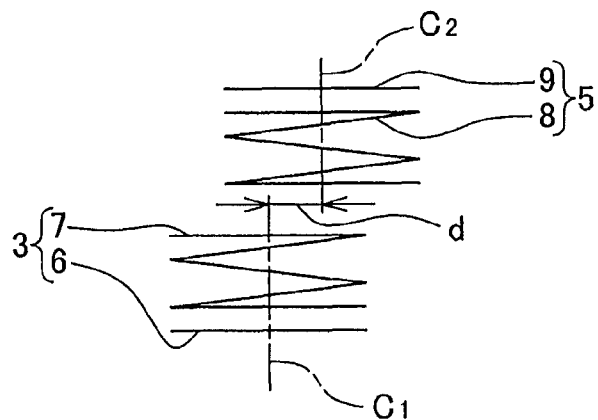
FIG. 23 is an explanatory view for explaining a problem of the conventional power supplying system.
Figure 24:
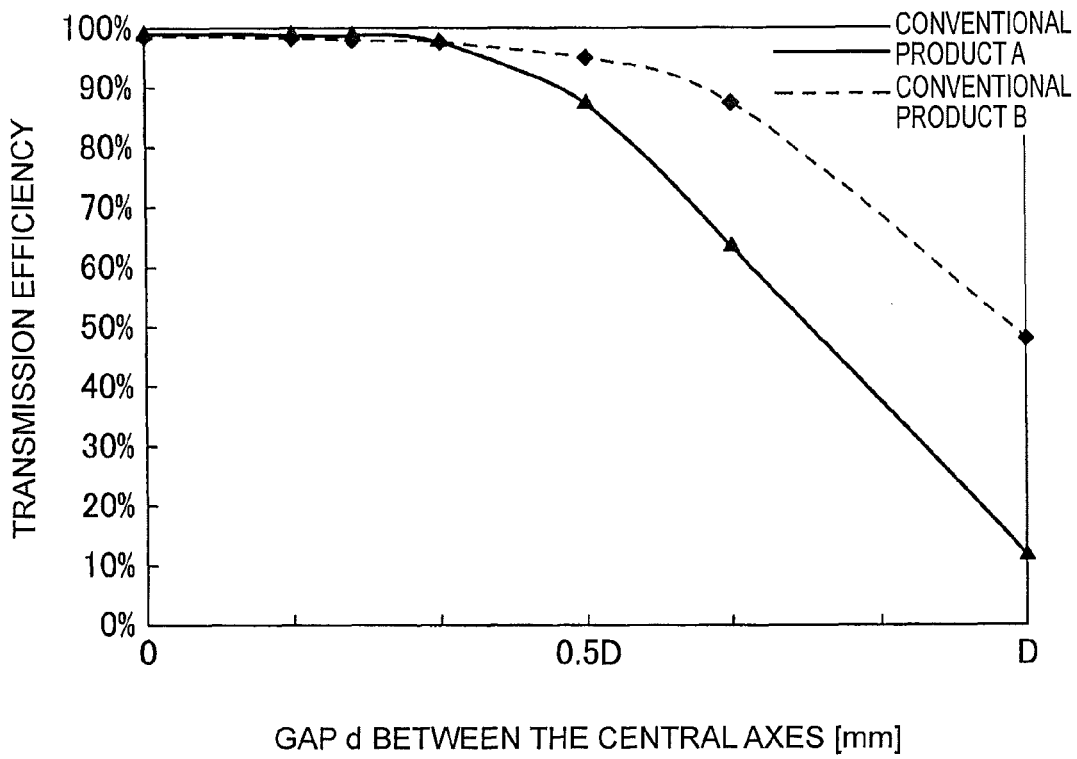
FIG. 24 is a graph showing a relationship between the gap d of the central axes $C_1$, $C_2$ and the transmission efficiency in the conventional product A as the power supplying system shown in FIG. 22 and the conventional product B as the power supplying system shown in FIG. 25.

Further, the present inventors simulated the transmission efficiencies S21, S31 with respect to AC frequency supplied to the power supplying loop antenna 6, and the transmission efficiency S32 between the power supplying helical coil 7 and the power receiving helical coil 8 in the power supplying system 1 of the present invention product shown in FIGS. 15 to 17, when the gap d is fixed to 0 mm, and a distance A between two power receiving helical coils 8a, 8b is 3.33D mm. The result is shown in FIG. 20A. Further, the present inventors simulated the transmission efficiencies S21, S31 with respect to AC frequency supplied to the power supplying loop antenna 6, and the transmission efficiency S32 between the power receiving helical coils 8a, 8b, when the gap d is fixed to 0 mm, and the distance A between two power receiving helical coils 8a, 8b is 2D mm. The result is shown in FIG. 20B. As shown in FIG. 20B, when the distance A between the two power receiving helical coils 8a, 8b is short, the mutual interference between the two power receiving helical coils 8a, 8b, namely, the transmission efficiency S32 becomes large, and the frequency in which the transmission efficiency S32 is the maximum is increased. Therefore, it is necessary that the distance A between the two power receiving helical coils 8a, 8b is fixed.

According to the above embodiment, when a plurality of power receiving helical coils 8a, 8b is provided and arranged separated from each other in the same plane, the reduction of the transmission efficiency caused by the gap between the central axes $C_1$ of the power supplying helical coil 7 and $C_{21}$, $C_{22}$ of the power receiving helical coils 8a, 8b is suppressed, and the electric power can be supplied from the power supplying section 3 to the power receiving section 5 with high efficiency.

Further, according to the above embodiment, when the diameter $R_{21}$ of the power supplying helical coil 7 is provided larger than the diameters $R_{22}$ of the power receiving helical coils 8a, 8b, the reduction of the transmission efficiency caused by the gap between the central axes $C_1$ of the power supplying helical coil 7 and $C_{21}$, $C_{22}$ of the power receiving helical coils 8a, 8b is further suppressed, and the electric power can be supplied from the power supplying section 3 to the power receiving section 5 with high efficiency.

Incidentally, in the above embodiment, two power receiving loop antennas 9a, 9b and two power receiving helical coils 8a, 8b are provided. However, the present invention is not limited to this. All it takes is a plurality of power receiving loop antennas and a plurality of power receiving helical coils, and for example, three power receiving loop antennas and three power receiving helical coils are acceptable.

Further, in the above embodiment, the diameter $R_{21}$ of the power supplying helical coil 7 is provided larger than the diameters $R_{22}$ of the power receiving helical coils 8a, 8b. However, the present invention is not limited to this. All it takes is that due to the gap d, even if the electric power transmitted to one of power receiving helical coils 8a, 8b is reduced, the electric power transmitted to the other is increased. For example, the diameter $R_{21}$ of the power supplying helical coil 7 may be provided equal to the diameters $R_{22}$ of the power receiving helical coils 8a, 8b.

Further, the above embodiment only shows a representative example of the present invention. The present invention is not limited to the embodiment. Namely, various modifications can be practiced within a scope of the present invention.

REFERENCE SIGNS LIST 1 power supplying system
7a power supplying helical coil (power supplying coil)
7b power supplying helical coil (power supplying coil)
8 power receiving helical coil (power receiving coil)
8a power receiving helical coil (power receiving coil)
8b power receiving helical coil (power receiving coil)
11 CPU (position detecting device, first power supplying device, second power supplying device)
12 transmitter
13a receiver
13b receiver
14 transmitting circuit (transmitting device)
15a receiving circuit (receiving device)
15b receiving circuit (receiving device)
16a reflective wave detector (reflective wave detecting device)
16b reflective wave detector (reflective wave detecting device)
17a power supplying spiral coil (power supplying coil)
17b power supplying spiral coil (power supplying coil)
18 power receiving spiral coil (power receiving coil)
$C_1$ central axis
$C_{21}$ central axis
$C_{22}$ central axis

The invention claimed is:

1. A power supplying system comprising:
a plurality of power supplying coils to which electric power is supplied;
a power receiving coil to which electric power from the power supplying coils is transmitted by electromagnetic resonance with the power supplying coils when the power receiving coil is arranged opposite to and separated from the power supplying coils in a central axis direction thereof;
a position detecting device configured to detect one power supplying coil closest to the power receiving coil among the plurality of power supplying coils as an adjacent coil;
a first power supplying device configured to supply the electric power to only the adjacent coil detected by the position detecting device among the plurality of power supplying coils;
a second power supplying device configured to supply the electric power sequentially to the plurality of power supplying coils; and
a reflective wave detecting device configured to detect reflective waves of the electric power reflected by each of the power supplying coils,
wherein the position detecting device detects the power supplying coil having the smallest reflective wave detected by the reflective wave detecting device as the adjacent coil among the plurality of power supplying coils while the second power supplying device supplies the electric power.

2. The power supplying system as claimed in claim 1, wherein the power supplying coils and the power receiving coil are formed in a circular helical shape, and
wherein the plurality of power supplying coils are partially overlapped with each other.

3. The power supplying system as claimed in claim 1, wherein the power supplying coils and the power receiving coil are formed in a rectangular spiral shape, and
wherein the plurality of power supplying coils are separated from each other in the same plane.

* * * * *